(12) United States Patent
Kelle et al.

(10) Patent No.: US 8,300,896 B2
(45) Date of Patent: Oct. 30, 2012

(54) REMOTE SENSING AND PROBABILISTIC SAMPLING BASED FOREST INVENTORY METHOD

(76) Inventors: Olavi Kelle, Hatfield, PA (US); Eric P. Macom, Shepherdstown, WV (US); Robert Pliszka, Sellersville, PA (US); Neeraj Mathawan, Montgomery, PA (US); James W. Flewelling, Seattle, WA (US)

( * ) Notice: Subject to any disclaimer, the term of this patent is extended or adjusted under 35 U.S.C. 154(b) by 0 days.

(21) Appl. No.: 12/618,321

(22) Filed: Nov. 13, 2009

(65) Prior Publication Data

US 2011/0110562 A1    May 12, 2011

Related U.S. Application Data

(63) Continuation of application No. 11/728,099, filed on Mar. 23, 2007, now Pat. No. 7,639,842, which is a continuation-in-part of application No. 10/139,001, filed on May 3, 2002, now Pat. No. 7,212,670.

(60) Provisional application No. 60/814,715, filed on Jun. 19, 2006.

(51) Int. Cl.
*G06K 9/00*    (2006.01)

(52) U.S. Cl. ...................................... 382/109; 382/100
(58) Field of Classification Search .................. 382/100, 382/108, 109, 284
See application file for complete search history.

(56) References Cited

U.S. PATENT DOCUMENTS 7,639,842 B2 * 12/2009 Kelle et al. .................... 382/109

OTHER PUBLICATIONS

Torma (IEEE pub tilted Estimation of Tree Species Proportions of Forest Compartments using Ranging Scatterometer) 1999.*
Hyyppa (IEEE pub titled a Forest Inventory Method by Combining Radar0Derived Stand Profiles and Aerial Photograph), IEEE, 2002.*

* cited by examiner

*Primary Examiner* — Alex Liew
(74) *Attorney, Agent, or Firm* — Spilman Thomas & Battle, PLLC; Richard W. James

(57) ABSTRACT

A remote sensing and probabilistic sampling based forest inventory method can correlate aerial data, such as LiDAR, CIR, and/or Hyperspectral data with actual sampled and measured ground data to facilitate obtainment, e.g., prediction, of a more accurate forest inventory. The resulting inventory can represent an empirical description of the height, DBH and species of every tree within the sample area. The use of probabilistic sampling methods can greatly improve the accuracy and reliability of the forest inventory.

2 Claims, 25 Drawing Sheets

REMOTE SENSING AND PROBABILISTIC SAMPLING BASED FOREST INVENTORY METHOD

RELATED APPLICATIONS

The present application is a Continuation-In-Part of U.S. patent application Ser. No. 10/139,001, filed May 3, 2002, and also claims priority to U.S. Provisional Patent Application Ser. No. 60/814,715, filed Jun. 19, 2006.

BACKGROUND

The remote sensing and probabilistic sampling based forest inventory method described herein relates to analyzing combined digital images and LiDAR data to extract, classify, and analyze aggregate and individual features, such as trees. More particularly, the remote sensing and probabilistic sampling based method relates to an improved method for producing an accurate forest inventory.

SUMMARY

An embodiment of a remote sensing and probabilistic sampling based forest inventory method as described herein can generally comprise processing remote sensing data which is indicative of tree attribute information; defining a sampling frame within the remote sensing data; determining a field plot corresponding to said sampling frame and collecting field plot data therefrom, said field plot data comprising actual tree attribute information; creating a regression formula using the correlated tree match database and the remote sensing data from the sampling frame; generating a correlated model using the regression formula; and then applying the correlated model to all remote sensing data to create an accurate forest inventory.

The remote sensing data can comprise LiDAR data, digital images, and/or property boundary information, and the tree attribute information be tree height, diameter, and/or species. The field plot data can be actual, measured tree attribute information. The field plot data can be obtained via precise physical measurements of trees on the ground, and the field plot can be matched to the sampling frame using, for example, a highly accurate Geographical Information System ("GIS") to ensure that the sampling frame matches up with the field plot where the field data is measured.

Generation of the correlated model can further comprises verifying the accuracy and/or the quality of the correlated model. Verifying the accuracy of the correlated model can comprise. Verifying the quality of the correlated model can comprise.

Basically, the remote sensing and probabilistic sampling based forest inventory method described herein can generally comprise the use of probabilistic sampling based methods to accurately capture forest inventory. The remote sensing data can be aerial data, such as the aforementioned LiDAR data and digital images, e.g., Color Infrared Spectral ("CIR") photography, and/or Multispectral photography. Also, Hyperspectral data can be used instead of multispectral or CIR data. Via a sampling frame and corresponding field plot, the remote sensing data can be correlated with actual sampled and measured field data to obtain (predict) an accurate forest inventory. The resulting tree inventory can represent an empirical description of tree attributes, such as height, diameter breast height ("DBH") and species for every tree within the selected inventory area.

BRIEF DESCRIPTION OF THE DRAWING FIGURES

DETAILED DESCRIPTION OF CERTAIN EMBODIMENTS

A remote sensing and probabilistic sampling based forest inventory method is described in detail hereinafter. In the following description, for purposes of explanation, numerous specific details of exemplary embodiments are set forth in order to provide a thorough understanding of the a remote sensing and probabilistic sampling based forest inventory method. However, it may be evident to one skilled in the art that the presently described methods may be practiced without these specific details. The method can be most suitably performed using a computer system, e.g., a processor, storage media, input device, video display, and the like.

Probabilistic Design-Conceptual Level

Figure 1:
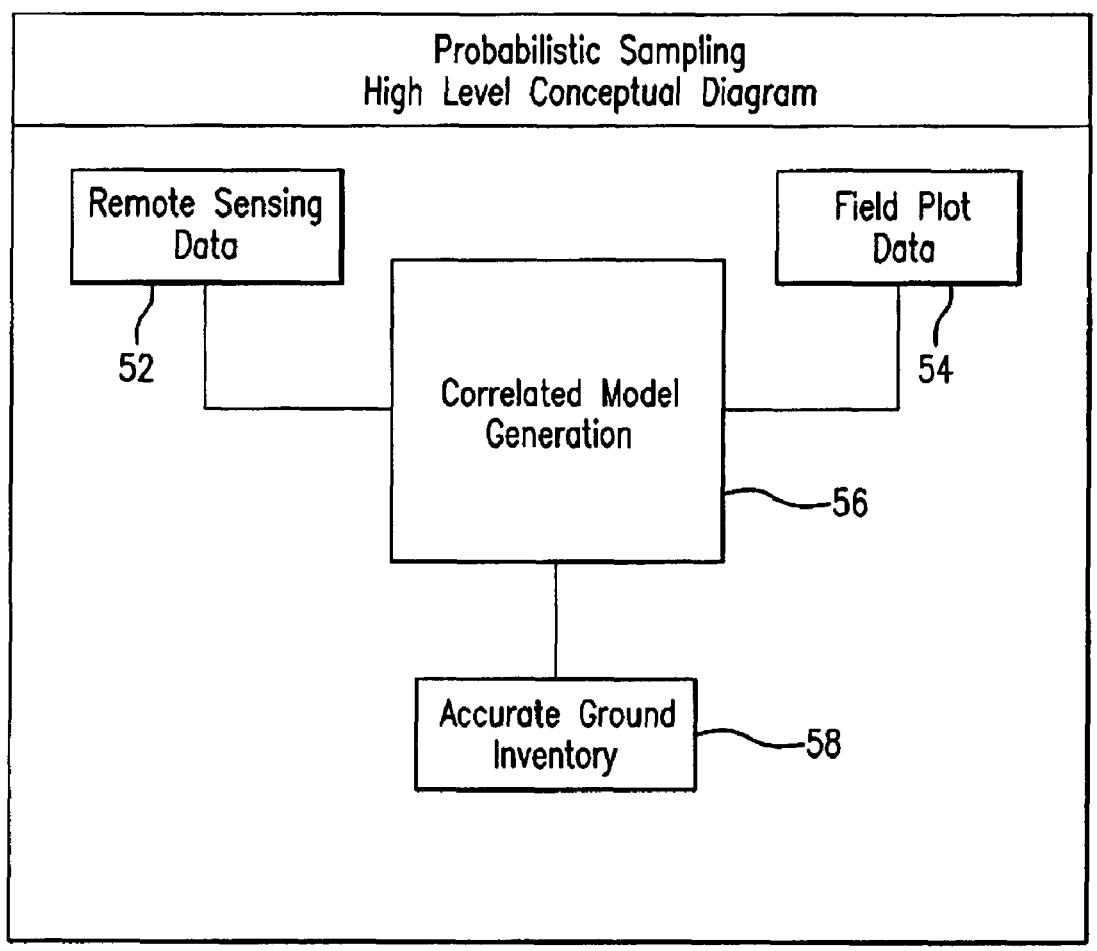
FIG. 1 is a high level diagram of an embodiment of a remote sensing and probabilistic sampling based forest inventory method.
Figure 2:
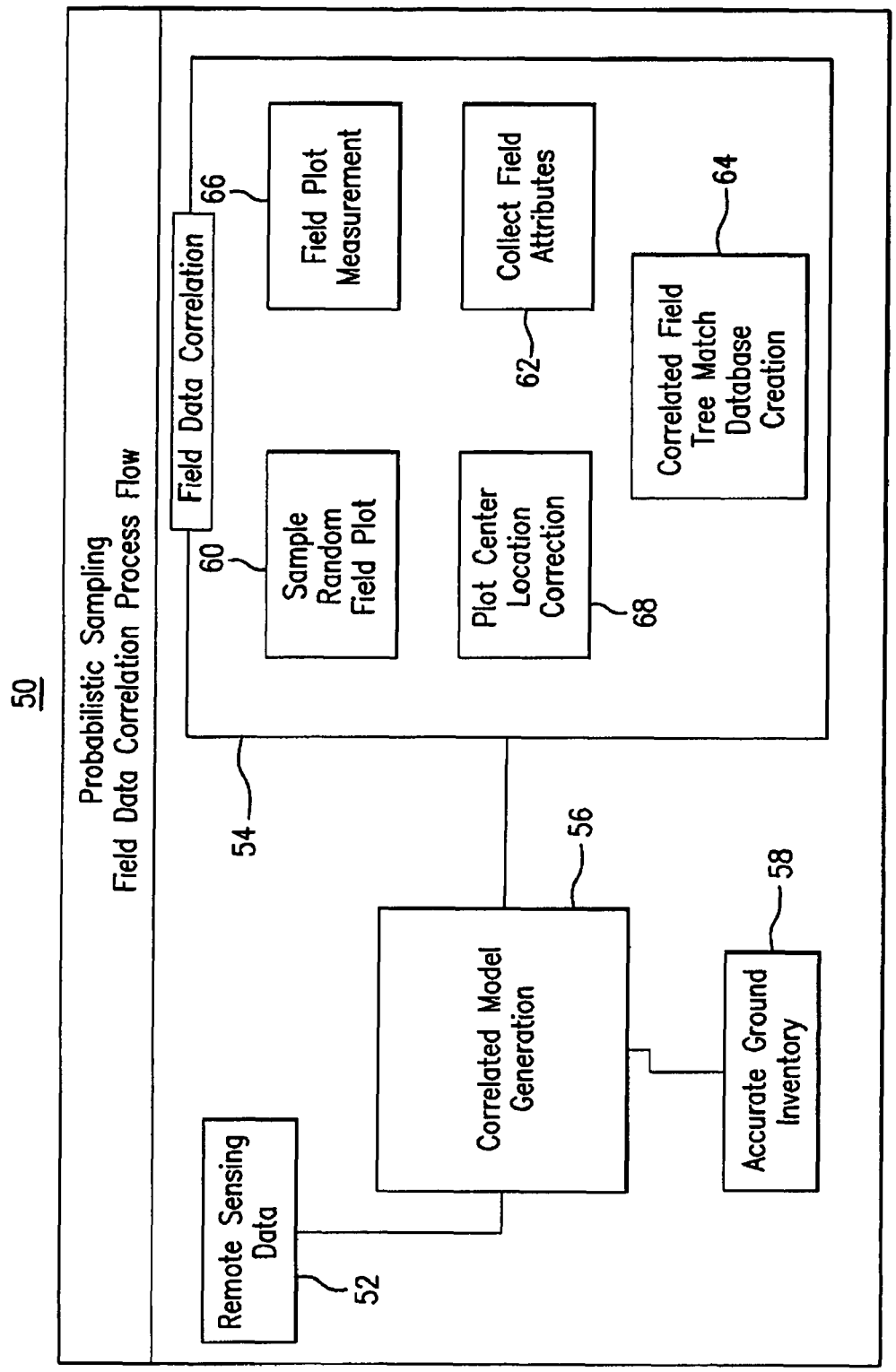
FIG. 2 is a high level diagram of an embodiment of a field data correlation method.
Figure 3:
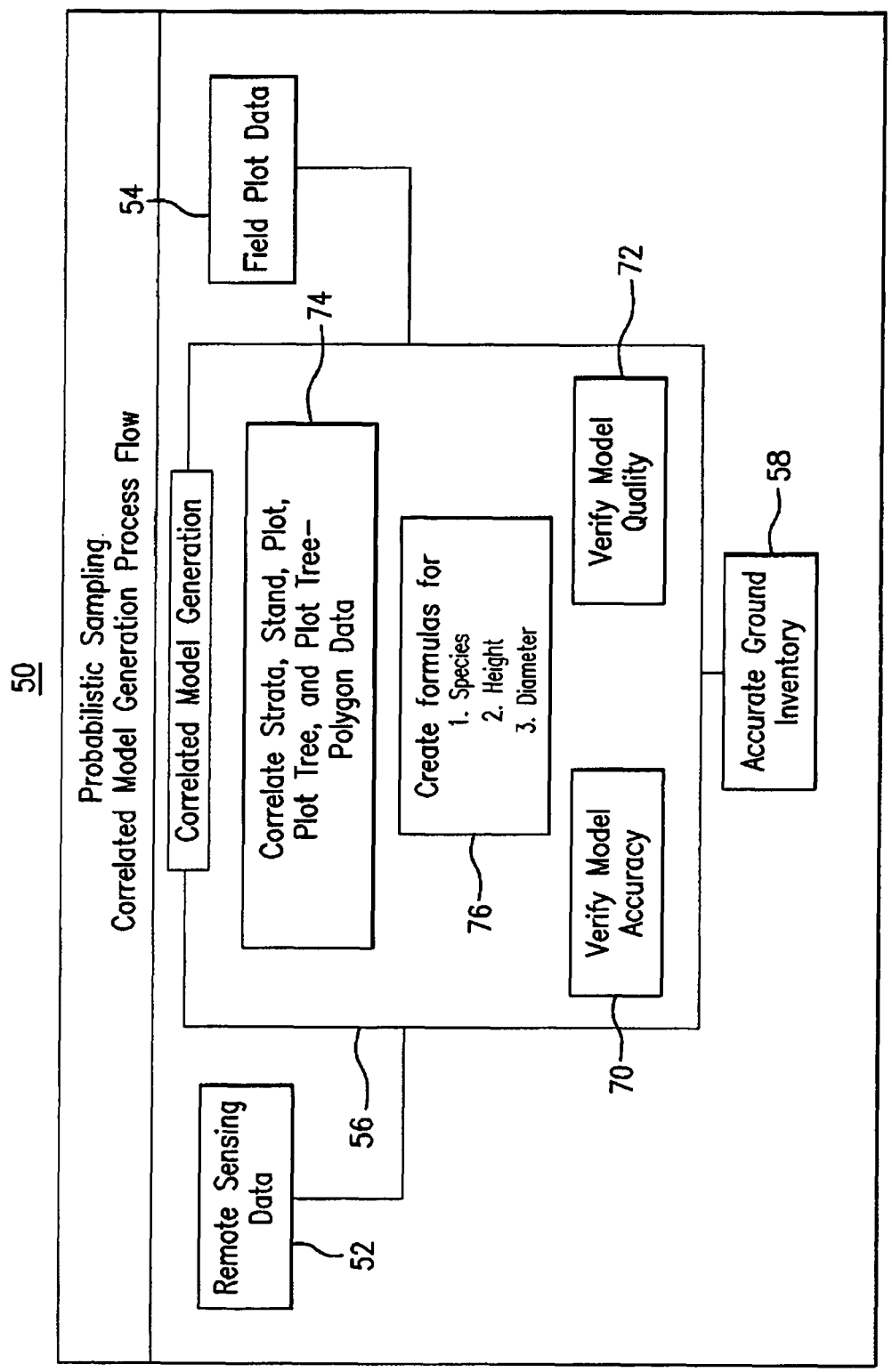
FIG. 3 is a high level diagram of an embodiment of a correlated model generation method.
Figure 4:
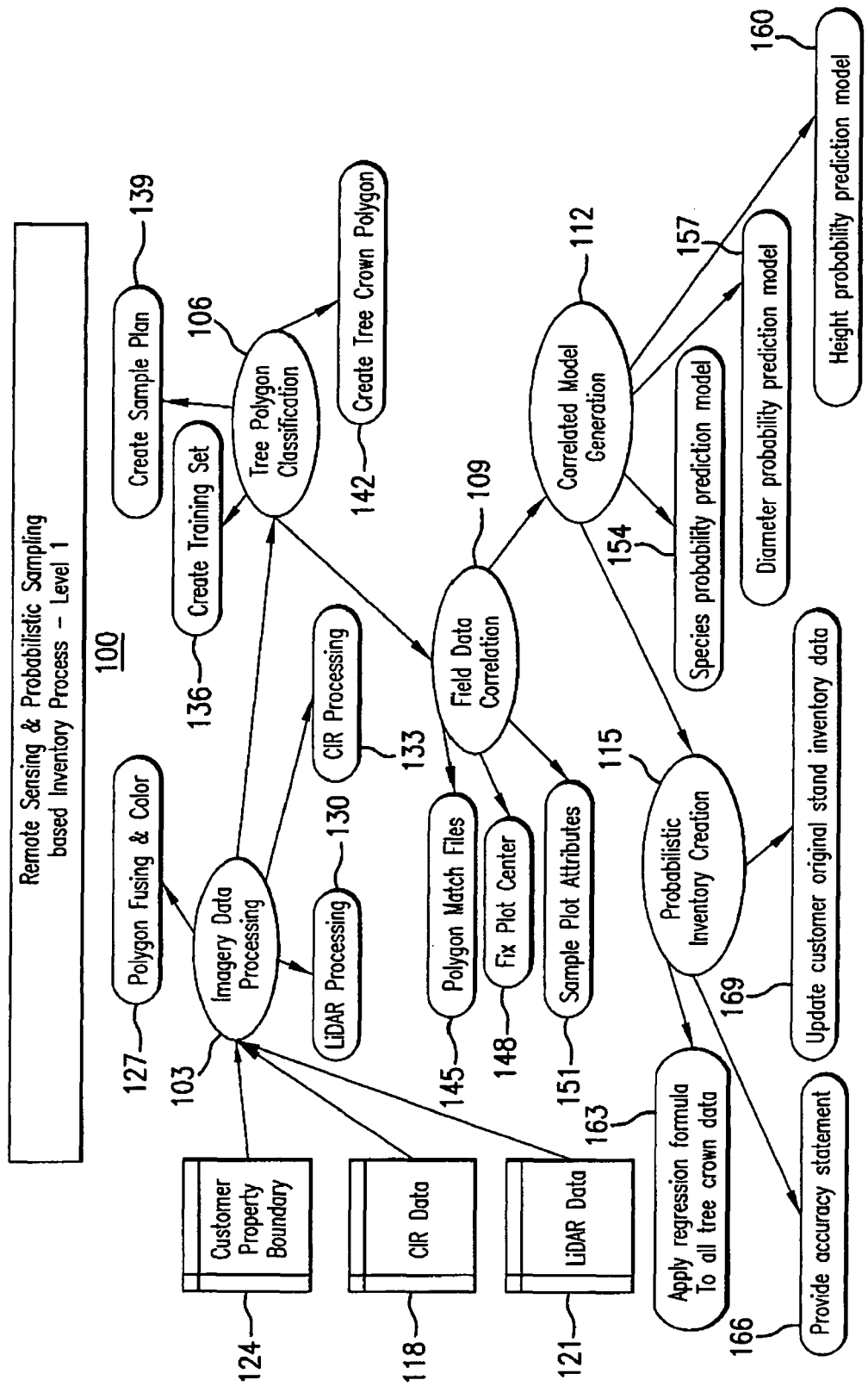
FIG. 4 is a high level diagram of another embodiment of a remote sensing and probabilistic sampling based forest inventory method.

The "probabilistic sampling" method described herein is based upon remote sensing data that is blended with field plot data and used to create a correlated model, and is represented at the conceptual level in FIGS. 1 through 3. A high level diagram of an exemplary embodiment of a remote sensing and probabilistic sampling based forest inventory method 50 is illustrated in FIG. 1, which can generally comprise utilizing remotely sensed data 52 in combination with field plot data 54 to generate a correlated model 56 which can be utilized to create a more accurate forest (ground) inventory 58. The remote sensing data 52 can be indicative of tree attribute information for the forest, and from this data one or more sample frames can be defined for subsequent use in creating the probabilistic sampling based forest inventory 58. The remote sensing data 52 can comprise aerial data, such as LiDAR data, digital images, and/or property boundary information. The digital images can include CIR, multispectral and/or hyperspectral photography. Multispectral imagery can contain about 3-10 channels. Generally, hyperspectral imagery contains hundreds of bands for each pixels and has typically much larger pixel sizes than can be required according to the embodiments of the methods described herein. Nevertheless, hyperspectral imagery could potentially be utilized.

Field Data Correlation

The field plot data 54 can be obtained via precise physical measurements of trees on the ground, wherein the field plot 60 is matched to the sampling frame (or vice-versa) using, for example, a highly accurate geographical information system (GIS) to ensure that the sampling frame matches up with the field plot 60 where the field data 54 is being measured. One, or multiple, sampling frames (which can be randomly selected) and corresponding field plots can be utilized. A set of correlated field plots can create a set of geo-referenced points, each attributed with a tree's data. Taken over a range of random samples, these plots 60 can be classified as unbiased by a forest biometrician. "Unbiased" sampling methodology is critical to a forest inventory in the same way that GAAP (Generally Accepted Accounting Principles) is critical in the analysis of financial performance of corporate entities. Any bias introduced in the sampling methodology makes all measurement results suspect.

FIG. 2 is a diagram of an embodiment of a correlation process to manipulate the field plot data 54, which process can generally comprise determining a sample field plot 60; collecting field plot data 54 therefrom, and then utilizing the data. The field plot 60 can correspond to a sampling frame defined from the remote sensing data 52. Alternatively, the field plot 60 can be selected first, and a sampling frame from the remote sensing data 52 can be defined which corresponds to the selected field plot. Whichever the case, the idea is to correlate remote sensing data 52 to actual field plot data 54 in order to create a correlated model (e.g., regression formulas and associated coefficients, as described hereinafter in more detail). This correlated model can then be applied to all of the remote sensing data 52 to produce a more accurate, probabilistic sampling based forest inventory 58.

The field plot data 54 can further comprise actual field attributes 62 and field plot measurement data 66. The field attributes can include tree attributes such as tree species, tree diameter and tree height, which can be used to create a correlated tree match database 64. The field data correlation process can include plot center location correction 68 to ensure the field plot 60 accurately corresponds to the associated sampling frame.

Correlated Model Generation

Referring more particularly to FIG. 3, the remote sensing data 52 and field plot data 54 can be combined to generate a correlation model 56 which can be comprised of formulas, e.g., for tree species, height, and diameter, and can also include verifications of facts and relationships between stand data, strata data, plot data, plot-tree data, and plot-tree-polygon data, as would be understood by one of ordinary skill in the art, and as may be discerned from the detailed description which follows hereinafter.

A stand is a group of trees that, because of their similar age, condition, past management history, and/or soil characteristics, are logically managed together. Stratification (creating strata) is the process of aggregating the forest into units of reduced variability. Plots are small areas selected in stands, where field measurements are made. Plot tree-polygon data is the data about tree polygons created for stands that happen to be inside these plots.

The correlated model generation 56 can comprise correlating 74 the remote sensing data 52 and the field plot data 54 (via the correlated tree match database 64) in order to derive formulas 76, e.g., regression formulas, and associated coefficients, for tree species, tree height, and tree diameter. The correlated model 56 can then be applied to all remote sensing data 52 to produce an accurate probabilistic sampling based forest inventory 58. The resulting inventory 58 can represent an empirical description of tree attributes, such as species, height, and diameter breast height ("DBH") for every tree within the selected inventory area.

Generation of the correlated model 56 can further comprise verifying the accuracy 70 and/or the quality 72 of the correlated model 56. Model accuracy 70 can be verified by comparing the DBH, as well as the height, volume, and stem number values (as measured on the field plot 60) against what the model predicts these numbers should be for the exact same areas. Additionally, specially designed "control plots" could be used in a model verification process. Next, statistical estimates based on these two different plot inventory sets can be calculated and analyzed. Model quality 72 can be verified using quality control means, which can comprise procedures to check and ensure that there are no calculation errors in the models being utilized. In general, model quality can be related to model accuracy.

OVERVIEW AND EXAMPLES

LiDAR and multispectral imagery, for example CIR photography, could be used separately, but in preferred embodiments are used together to identify and characterize individual tree crowns. Operationally, it is feasible to collect data for entire forests, and to construct digital maps with stand boundaries and with polygons representing tree crowns. Techniques to create crown polygons, assign species and impute tree sizes are the subject of many ongoing research efforts in Scandinavia, the United States, and elsewhere.

A starting point for sampling can be a map with crown polygons attributed with species and possibly LiDAR height; which can be used as a sampling frame for a statistically valid forest inventory 58. The sample design might assign the stands to strata, randomly select stands for sampling, and might randomly choose two or more map coordinate locations within the selected stand polygons to serve as plot centers (for sampling frames) to obtain field plot data to correlate to the sampling frames.

Fixed-area field plots 60 can be installed at these selected locations (sampling frames). Departures from conventional inventory procedures are that the plot 60 is centered as close as is technologically feasible to the pre-selected coordinates, and the plot 60 is stem-mapped. A fixed-area image plot is identified in the sample frame and co-located with the ground/field plot. The field trees and crown polygons are matched. Models are then fit, or calibrated, to predict what the individual crown polygons actually represent in terms of tree counts, species, DBH's and tree heights. These models can be approximately unbiased for basal area and tree count by species at the strata level. Field trees that are not matched to crown polygons are modeled separately. The models are applied to the sample frame so as to estimate the entire forest inventory 58; the predicted trees are summed by stand to create stand tables. The modeling strategies, and the methods for handling plot co-location, tree and crown polygon matching, and stand boundary overlap all present interesting challenges, which are addressed by the present method, are described in more detail below.

More particularly, embodiments of the correlation of the remote sensing data 52 and the field plot data 54 can further comprise one or more of the following steps:

- measuring the field plot center using a survey grade GPS device.
- saving the tree species, height and DBH information for all trees in the plot.
- measuring the distance to the plot center and azimuth.
- adding relative tree locations to the GPS locations, and displaying these absolute locations overlaid on aerial digital and LiDAR imagery.
- field crews correcting the field plot center location to a location that results in the best match between tree locations on the digital and/or LiDAR imagery and the locations measured in the field.
- using a tree recognition algorithm to detect objects, i.e., tree polygons, on the digital and/or LiDAR imagery— optimally (but not necessarily) these objects correspond to individual trees.
- calculating tree polygons attributes, LiDAR height estimates, area, color (on CIR imagery), and/or estimated tree species.
- tree polygon objects located in the plot areas are extracted from the data and used for the procedures described below, matching and/or statistical analysis.
- using automatic field tree matching to create a table in which measured field tree records are merged with tree polygon objects based upon geographic proximity.
- manually fixing the tree matching described above based upon interpreter estimate that current field tree is either contributing to some pixels of the tree polygon that was created or it is not visible from air because of a larger tree that contributed all or some pixels of the tree polygon.
- using statistical analysis for the data set of field trees, tree polygon objects and/or the relations created in the two preceding steps.
- the prediction estimates, e.g., the probabilities that tree polygons correspond to 0,1,2, 3 . . . trees; the probabilities for tree species for these trees; and the probabilities for DBH and height for these predicted trees the prediction can also estimate the number of trees "not seen," i.e., which have no correlation with the tree polygons.

applying these predictions, obtained using the data for field plot areas, on polygons over the entire inventory area (an example of probabilistic sampling based predictions is provided hereinafter).

for predicted tree DBH and height values, using appropriate models to predict the volumes, and then aggregating these values to create a stand level inventory.

Referring back to FIG. 3, specifically block 76, according to a probabilistic sampling based method, this part of the process can comprise more than a single estimate for determinations such as, for example, how many trees there might be and what might be the species of the (largest) tree corresponding to the tree polygons. These alternative events can be assigned probabilities, and the final DBH and volume estimates can be based upon summing up the DBH and volume estimates for these events, with their probabilities to take into account.

Model accuracy 70 can be verified by comparing the DBH, as well as the height, volume, and stem number values (as measured on the field plots) against what the model predicts these numbers should be for the exact same areas. Additionally, specially designed "control plots" could be used in a model verification process. Next, statistical estimates based on these two different plot inventory sets can be calculated and analyzed.

Model quality 72 can be verified using quality control means, which can comprise procedures to check and ensure that there are no calculation errors in the models being utilized. In general, model quality can be related to model accuracy.

Example of Probabilistic Sampling Based Predictions

The data contained in the tree match database 64 is used to predict the stem count, DBH, basal area, total height and volume estimates for all stands. The estimates are based on probability theory and estimating the probabilities of several conditional events. These events (referred to herein as tree record sequences, or TRS) are saved into the database. Separate DBH, height, and volume models are created for separate TRS events.

The following is an example of a TRS table corresponding to a single polygon:

| TRS | Description | SG | E(C) |
|---|---|---|---|
| 1 | Single Tree | 1 | $\Pr\{C=1\} \times \Pr\{SG=1|C=1\}$ |
| 2 | Single Tree | 2 | $\Pr\{C=1\} \times [1 - \Pr\{SG=1|C=1\}]$ |
| 3 | Larger of (1, 1) | 1 | $\Pr\{C=2\} \times \Pr\{species=(1,1)|C=2\}$ |
| 4 | Smaller of (1, 1) | 1 | $\Pr\{C=2\} \times \Pr\{species=(1,1)|C=2\}$ |
| 5 | Larger of (1, 2) | 1 | $\Pr\{C=2\} \times \Pr\{species=(1,2)|C=2\}$ |
| 6 | Smaller of (1, 2) | 2 | $\Pr\{C=2\} \times \Pr\{species=(1,2)|C=2\}$ |
| 7 | Larger of (2, 1) | 2 | $\Pr\{C=2\} \times \Pr\{species=(2,1)|C=2\}$ |
| 8 | Smaller of (2, 1) | 1 | $\Pr\{C=2\} \times \Pr\{species=(2,1)|C=2\}$ |
| 9 | Larger of (2, 2) | 2 | $\Pr\{C=2\} \times \Pr\{species=(2,2)|C=2\}$ |
| 10 | Smaller of (2, 2) | 2 | $\Pr\{C=2\} \times \Pr\{species=(2,2)|C=2\}$ |
| 11 | Tertiary Conifer | 1 | $\Pr\{C=3\} \times E\{C \text{ for } P >= 3, SG=1|C=3\}$ |
| 12 | Tertiary Hardwood | 2 | $\Pr\{C=3\} \times E\{C \text{ for } P >= 3, SG=2|C=3\}$ |

The input variables used for analysis are polygon area (A) and the polygon height calculated from the LiDAR data (H). Also, species group prediction (S) was used, which was calculated from CIR imagery. For purposes of this example, only 2 species groups are used, namely—hardwood and conifer.

For all tree record sequence events, the following variables are calculated:
E(C) or estimated count,
the species group (SG),
DBH,
total height of the tree, and
the volume of the tree.

These are output variables of the prediction equations. The following example illustrates a manner of predicting all tree sequence values for tree polygon objects, using a regression analysis:

Estimated counts for TRS events are predicted for continuous values of A, H and the discrete values of S:
Prediction formula for the probability Pr(C>=1) is estimated for continuous values of A, H and discrete values of S
Prediction formula for the probability Pr(C>=2|C>=1), depending on A, H and S. The '|' denotes the conditional probability.
Prediction formula for the probability Pr (C>=3|C>=2), depending on A, H and S
Estimated tree specie groups for TRS events depend on position of the tree (P). The largest tree of the polygon has the P value 1, the second largest 2 and so on. The probability of the largest tree specie group was
Prediction formula for Pr{SG=1 for P=1|C=1]
Prediction formula for Pr{SG=1 for P=2|C=2)
Prediction formula for Pr{SG=1 for P=2|C=2, SG=1 for P=1)
Prediction formula for Pr{SG=1 for P=2|C=2, SG=2 for P=1)
Estimated counts for tertiary trees as follows:
Prediction for E{C for P>=3|C=3}
Estimated DBH values
Prediction for DBH(A, H|SG=1, P=1)
Prediction for DBH(A, H|SG=2, P=1)
Prediction for DBH(A, H|SG=1, P=2)
Prediction for DBH(A, H|SG=2, P=2)
Estimated height values
Prediction for HT(A, H|SG=1]
Prediction for HT(A, H|SG=2]
Volume equations
Volume equations are not predicted. Instead, standard equations for the forest type are used to calculate volume from tree breast height diameter and total height values.

Prediction Formula Example $$Pr\{C=1\}=1/(1+\exp(c_0+c_1 \times A+c_2 \times H+c_3 \times A*H))$$

In this equation, the coefficients, $c_0$ through $c_4$, can be approximately 2.43, −0.0423, −0.0508 and, 0.00044, respectively.

Using the described predictions, estimated counts, diameters, heights, and volumes for all tree record sequences can calculated. By summing up these results over all of the polygons in the stands, a more accurate stem count, basal area, and volume estimate for whole stands can be calculated.

Referring now to the diagrams in FIGS. 4 through 9, a further embodiment of a remote sensing and probabilistic sampling based forest inventory method 100 is illustrated, which can generally comprise processing imagery data 103 (which data is indicative of at least tree attribute information); classifying tree polygons 106 within the imagery data to derive the tree attribute information (wherein the tree attribute information can be a number of trees indicated by the imagery data); correlating field data to the imagery data 109 (which correlating can comprise defining a sampling frame within the imagery data), collecting field data from a field plot determined to correspond to the sampling frame, wherein the field data comprises actual tree attribute information); creating a correlated model 112 by matching the tree attribute information derived from the imagery data with the actual tree attribute information from the field data; and probabilistic inventory creation 115, which can comprise extracting a regression formula using the correlated model and then applying the regression formula to all of the imagery data to produce an accurate inventory for the forest.

Generally, the imagery data processing 103 can comprise polygon fusing and color 127, LiDAR processing 130, and CIR processing 133. The tree polygon classification 106 can generally comprise creating a training set 136, creating a sample plan 139, and creating tree crown polygon 142. The field data correlation 109 can generally comprise creating polygon match files 145, fixing the plot center 148, sample plot attributes 151. The correlated model generation 112 can basically comprise creating a species probability prediction model 154, a diameter probability prediction model 157 and the height probability prediction model 160. The probabilistic inventory creation 115 can generally comprise a plotting and regression formula to all tree crown data 163, providing an accuracy statement 166 and updating customers' original stand inventory data 169.

Figure 5:
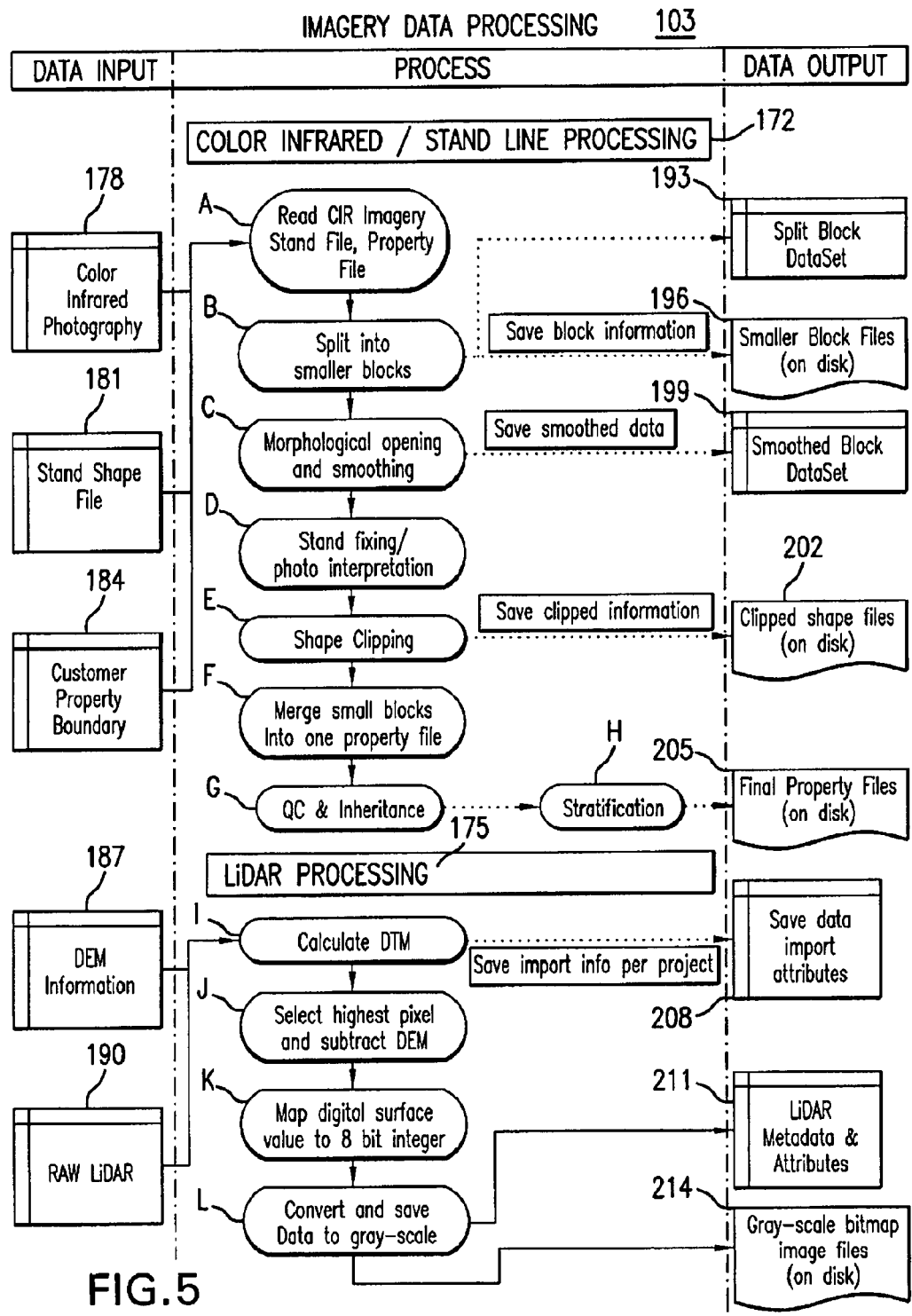
FIG. 5 is a lower level diagram of an embodiment of an imagery data processing method as illustrated in FIG. 4.

Turning now to FIG. 5, the digital imagery data processing 103 can further comprise CIR/Stand Line Processing 172 and LiDAR processing 175. The data input to the CIR/Stand Line Processing 172 can comprise CIR photography 178, stand shapes 181, and customer property boundary information 184. Alternatively, instead of, or in addition to, CIR photography, the digital images can be multispectral and/or hyperspectral. The stand shapes (and/or tree crown polygon shapes) can be derived from the imagery data input. The data input to the LiDAR processing 175 can comprise DEM (Digital Elevation model) information 187 and raw LiDAR data 190.

As illustrated, the color infrared/stand line processing 172 can comprise multiple steps, including one or more of the following:

A reading the input data 178;
B splitting the CIR imagery and stand lines into smaller blocks, which can be saved in, for example, a split block data set 193 and smaller block files 196;
C morphological opening and smoothing to create a smoothed block data set 199;
D stand fixing/photo interpretation;
E shape clipping, which can be saved as clipped shape files 202;
F merging small blocks into one property file;
G quality control and inheritance; and then
H stratification, after which data can be saved as final property files 205.

Creating the smoothed block data set 199 can comprise rasterizing the stand boundaries to remove all possible topology errors and features below a certain size that may be present in original stand boundaries. Afterwards, the morphological opening can be applied to the rasterized stand map, followed by vectorizing the stand shape again, generalizing and smoothing the shape and finally clipping the boundaries to the property boundaries.

As further illustrated, the LiDAR processing 175 can also comprise multiple steps, including one or more of the following:

I calculate DTM (digital terrain model) and saving import attributes 208;

J select highest pixel and subtract DEM (digital elevation model);

K map digital surface value to 8 bit integer;

L convert and save data to gray scale, and the LiDAR metadata and attributes 211 can be saved, as can gray scale bitmap image files 214.

Generally, the LiDAR processing can comprise calculating the DEM; selecting highest pixel and subtracting DEM; mapping digital surface value; and converting the data to grayscale. The laser scanning data provides a geo-referenced point cloud about earth's surface, DEM, which can include features like vegetation and buildings. The DTM can be calculated as a filtered version of DEM, and may contain only points classified as the "ground." Both DEM and DTM values are then calculated for some grid (for example 0.5×0.5 meter grid or 1.5×1.5 foot grid). If more than one DEM point hits one grid cell, the highest one is selected. If no DEM points hit the grid, the values are interpolated using nearest points. A DSM (digital surface model) is then calculated as the difference between the DEM grid and DTM grid. After that, the continues values of DTM grid are replaced with discreet digital numbers between 0 and 255, and the results are saved as 8-bit grayscale bitmap files.

Figure 6:
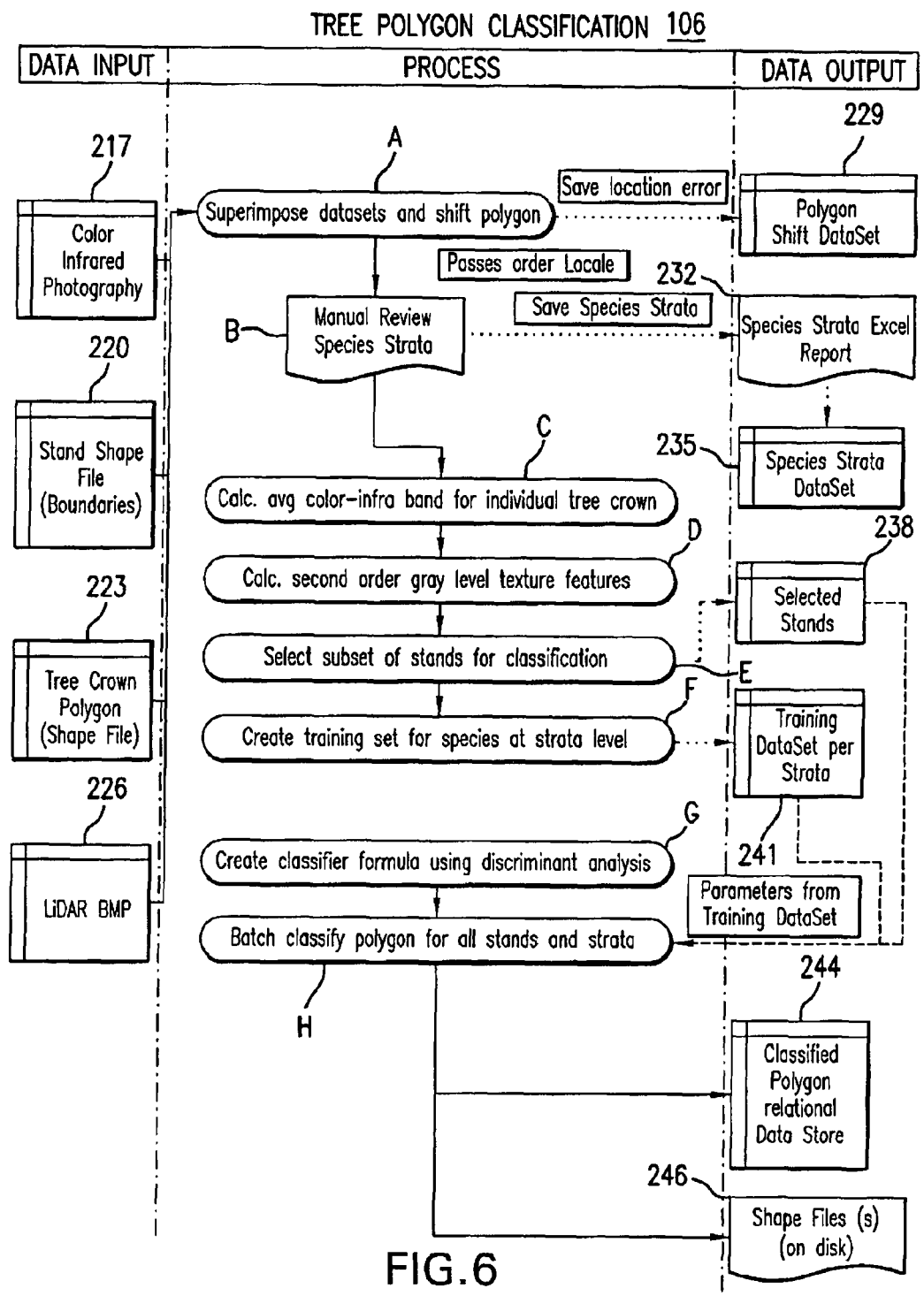
FIG. 6 is a lower level diagram of an embodiment of a tree polygon classification method as illustrated in FIG. 4.

FIG. 6 illustrates further details of the tree polygon classification 106, which can comprise superimposing input data, such as at least one of CIR photography 217, or multispectral photography, stand shapes 220, tree crown polygon shapes 223 and LiDAR data 226. The process 106 can further comprise multiple steps, including one or more of the following:

A superimpose data sets and shift polygons, and a polygon shift dataset 229 can be saved;

B manual review species strata, wherein a species strata excel report 232 and species strata data set 235 can be created;

C calculate average color-infrared band for individual tree crowns;

D calculate second order gray level texture feature;

E selecting a subset of stands for classification, which can be saved as selected stands file 238;

F create training set for species at strata level, which can be saved as a training data set per strata 241;

G create classifier formula using discriminant analysis; and

H batch classify polygons for all stands and strata, after which a classified polygon relational data store 244 can be created, as can be a shape file 246.

Generally, classifying tree polygons 106, in an embodiment thereof, can comprise creating a polygon shift dataset; calculating an average CIR, or multispectral, band for individual tree crowns; calculating a second order gray level texture feature; selecting a subset of stands for classification; creating a training set for species at strata level; creating a classifier formula using discriminant analysis; and batch classifying polygons for all stands and strata. Polygon shift refers to tree polygons created using the LiDAR data which are moved to locations where the same features are visible on the CIR or (multi-resolution) imagery. After shifting, average band values for these polygons are created for all CIR or (multi-resolution) image bands. Also, second order (spatial co-occurrence homogeneity) texture values are calculated for individual tree polygons. Based on stratification, some stands are selected for classification training. For these training stands, interpreters can select tree polygons and mark which species group they belong to, such as by using a computer mouse. The training set data (average band and texture values for the tree polygons classified by interpreter) are then analyzed using statistical software, and classes can be separated by a statistical method, such as a discriminant analysis. The resulting classifier is then applied for all stands and strata, and all tree polygons are assigned the probabilities of belonging to an identified species group.

Figure 7:
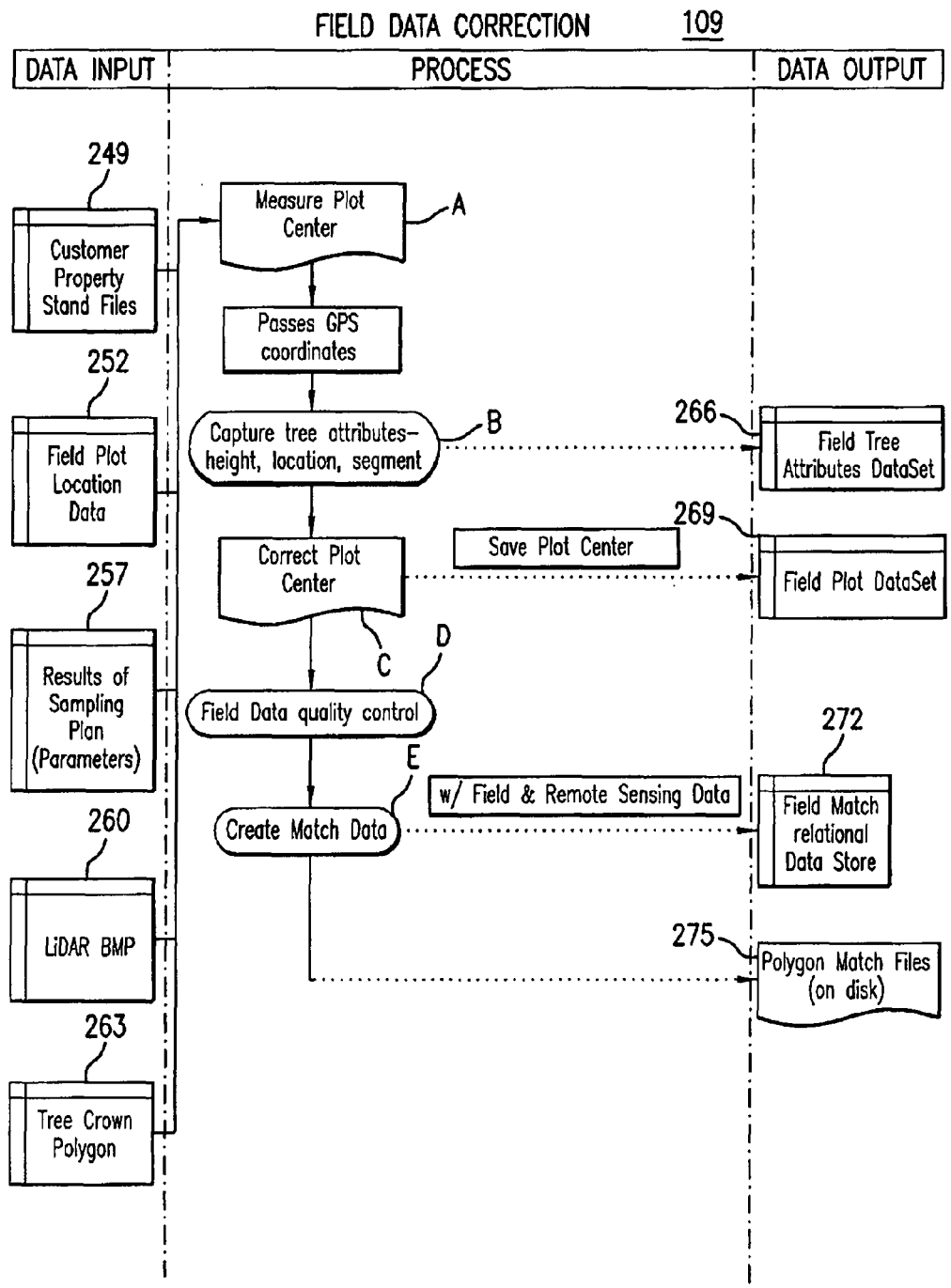
FIG. 7 is a lower level diagram of an embodiment of a field data correlation method as illustrated in FIG. 4.

FIG. 7 illustrates further details of the field data correlation 109. As mentioned previously, this can generally comprise determining a sample random field plot (which corresponds to a random sampling frame defined from the remote sensing data); and collecting field plot data (such as field plot measurements and field attributes). The plot center location can be corrected if necessary, so that the field plot matches the predefined sampling frame. The field attributes can comprise tree attribute data, which can be used to create a correlated field tree match database. Similarly to as described previously, an embodiment of the process 109 can further comprise multiple steps, including one or more of the following:

A measure plot center;

B capture tree attributes, for example, height, location, segment, and others, which can be saved in a field tree attributes data set 266;

C correct plot center;

D field data quality control; and

E create match data, wherein a field match relational data store 272 and polygon match files 275 can be saved.

Figure 8:
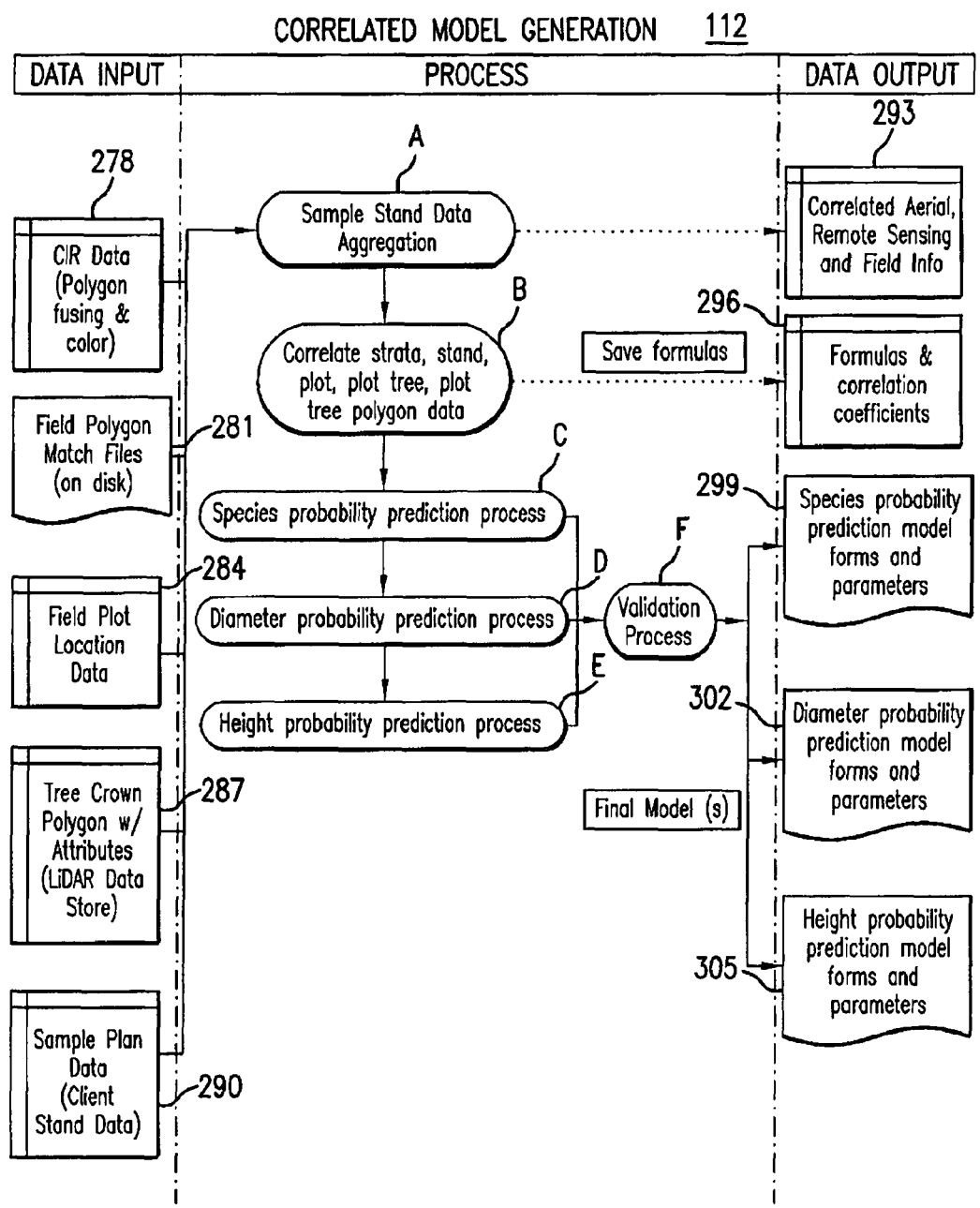
FIG. 8 is a lower level diagram of an embodiment of a correlated model generation method as illustrated in FIG. 4.

FIG. 8 illustrates further details of the correlated model generation 112, which can generally comprise correlating input data, such as CIR data (polygon fusing and data) 278, field polygon match files 281, field plot location data 284, tree crown polygon with attributes (LiDAR data) 287, and sample plan data 290. The process 112 can further comprise multiple steps, including one or more of the following:

A sample stand data aggregation, and storing correlated aerial remote sensing and field info 293;

B correlate strata, stand, plot, plot tree, plot tree polygon data, to create formulas and correlation coefficients, and storing such formulas and correlation coefficients 296;

C species probability prediction process;

D diameter probability prediction process;

E height probability prediction process; and

F a validation process for each of the three prediction process (for example, verification of accuracy and quality), which can include storing species probability prediction model forms and parameters, diameter probability prediction model forms and parameters, and height probability prediction model forms and parameters.

Moreover, as described previously, the correlated model generation 112, in an embodiment thereof, can comprise combining the data inputs listed above, which can include, for example, data output from one or more of the preceding processes, such as imagery data processing 103, tree polygon classification 106 and field data correlation 109. As also similarly described above in connection with FIG. 3, the correlated model generation 112 can comprise correlating the field plot data and the remote sensing data to create formulas, such as for tree species, height, and diameter. The correlated model generation 112 can further comprise deriving formulas and associated coefficients, via correlation of the remote sensing and field plot data, for the sample plot.

Basically, the correlated model generation 112 can comprise correlating strata, stand, plot, plot tree, and plot tree polygon data; and creating formulas to determine tree species; height; and diameter. Further processing can comprise verifying model accuracy and model quality to ensure an accurate ground/forest inventory is produced. An example of a probabilistic sampling based prediction is provided above in connection with FIG. 3.

Figure 9:
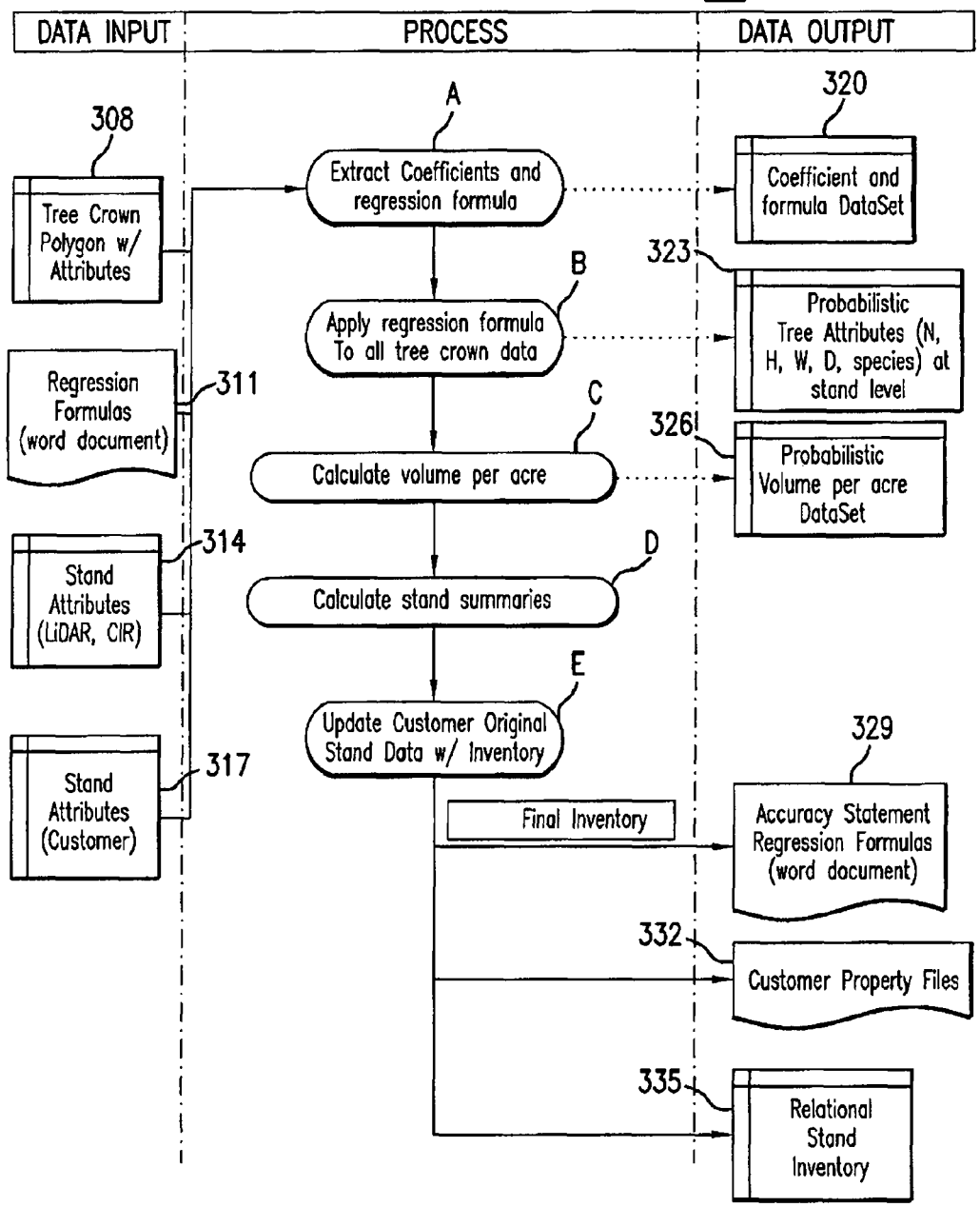
FIG. 9 is a lower level diagram of an embodiment of a probabilistic inventory generation method as illustrated in FIG. 4.

FIG. 9 illustrates further details of the probabilistic inventory generation 115, which can generally comprise manipulating input data, such as, tree crown polygon with attributes 308, regression formulas 311, stand attributes (LiDAR, CIR) 314, and/or stand attributes (customer) 317 to generate and accurate forest inventory. The process 115 can further comprise multiple steps, including one or more of the following:

G extract coefficients and regression formula, and storing coefficient and formula data set 320;

H apply regression formula to all tree crown data, and storing probabilistic tree attributes at stand level 323;

I calculate volume per acre, and store probabilistic volume per acre data set 326;

J calculate stand summaries; and

K update customer original stand data with inventory, which can include a final inventory, and storing accuracy statement regression formulas 329, a customer property file 332, and/or a relational stand inventory 335.

The probabilistic inventory generation 115, in an embodiment thereof, can generally overlap with the correlated model generation 56 described in connection with FIG. 3. In particular, the correlated model generation 56 process described previously can comprise extracting the regression formulas and coefficients, and applying these formulas and coefficients to all tree crown data to produce the forest inventory 58.

In contrast, although similarly named, the correlated model generation 112 does not apply the formulas and coefficients created in that step and apply them to all the tree crown data. Instead, the process of extracting the formulas and coefficients and then applying them to all the tree crown data to create the forest inventory is performed in the probabilistic inventory generation step 115.

A Method of Feature Identification and Analysis

A method of feature identification will now be described in connection with FIGS. 9 through 25, which corresponds to the method of feature identification and analysis described in the aforementioned related patent application. The following description relates to a method of accurately and efficiently classifying and analyzing a digital image that depicts forests and stands of trees. The trees represent individual features or objects depicted by the digital image, that comprise tree stands, which in turn are aggregate objects or features in the digital image. Examples of other individual features which are typically captured by digital images include, but are not limited to, single or small groupings of plants, trees or small groups of homogenous trees, a house, road or building or, in the case of a digital microscopic image, a vessel, cell or small number of cells. Aggregate features are comprised of large numbers of individual features, homogeneous or heterogeneous. Examples of aggregate features include, but are not limited to, a crops, marshlands, forests, and stands of trees.

The method can be most suitably performed using a computer system, e.g., a processor, storage media, input device, and video display in operable connection. Referring now to FIG. 9 illustrating one embodiment of the present invention, a digital image is taken of an area comprised of a number of individual features, e.g. trees, roads, or buildings, and aggregate features, e.g. stands of trees and forests, and relates to a method of accurately and efficiently inventorying the timber depicted by the image. The example includes segmenting forests into separate tree stands, segmenting the tree stands into separate tree crowns, and classifying the trees depicted in the digital image and segmented from the tree stands, analyzing the tree stand crown polygons to determine the crown area of the trees, and generating an accurate inventory of the tree stands and forests, comprised of the location, attribute data and valuation information produced by the preceding steps of the method. Optionally, the inventory can be stored in a designated vector file or other computer storage means.

The aggregate features of the digital image are separated into relatively homogeneous parts using a segmentation algorithm. In particular, a digital image of a portion of a forest, which typically depicts one or more species of trees of varying sizes, is segmented into stands of trees, which are preferably more homogeneous in composition than the forest itself. The stands are themselves segmented into polygons which encompass individual trees depicted in the portion of the digital image encompassed by the stand segment, such that the individual crowns of the trees are delineated by the polygons. The trees are then analyzed based on their crown area, classified by species or form model, or both, and using publicly obtainable forestry data and ratios to determine the tree's DBH and stem volume for each tree of a given species. The results of the classification and analysis are then compiled and saved in a searchable database, e.g., a vector file, such that a user of the system can determine the total stem volume for species of tree, or for trees of a range of DBH, or both, i.e., the total stem volume for a species of tree, including only trees of a certain minimal DBH, and optionally containing an accurate identification of the location and ownership of the trees, which is publicly available in tax parcel maps though difficult to obtain ordinarily. This information is particularly useful in the field of forestry, as it directly relates to the age of the forest, the health of the forest, and economic value of the trees contained in the forest, particularly since the location of the economically valuable trees is also identified.

Typical digital images for use in this method are taken from aerial platforms or satellites and are either stored digitally when taken or transferred into digital format. As such, the input images contain digital numbers associated with pixels on the image. Typical sources for digital images digital or film cameras or spectrometers carried by aircraft or satellite. At least visible color channels and infrared bandwidths can be used. Optionally, high pulse rate laser scanner data is used in combination with digital imagery. Digital input imagery is preferably of a resolution of 1 meter, more preferably 0.5 meter. Preferably, input images are ortho-rectified to a geocoded map and color balanced.

High Level Segmentation

Figure 10:
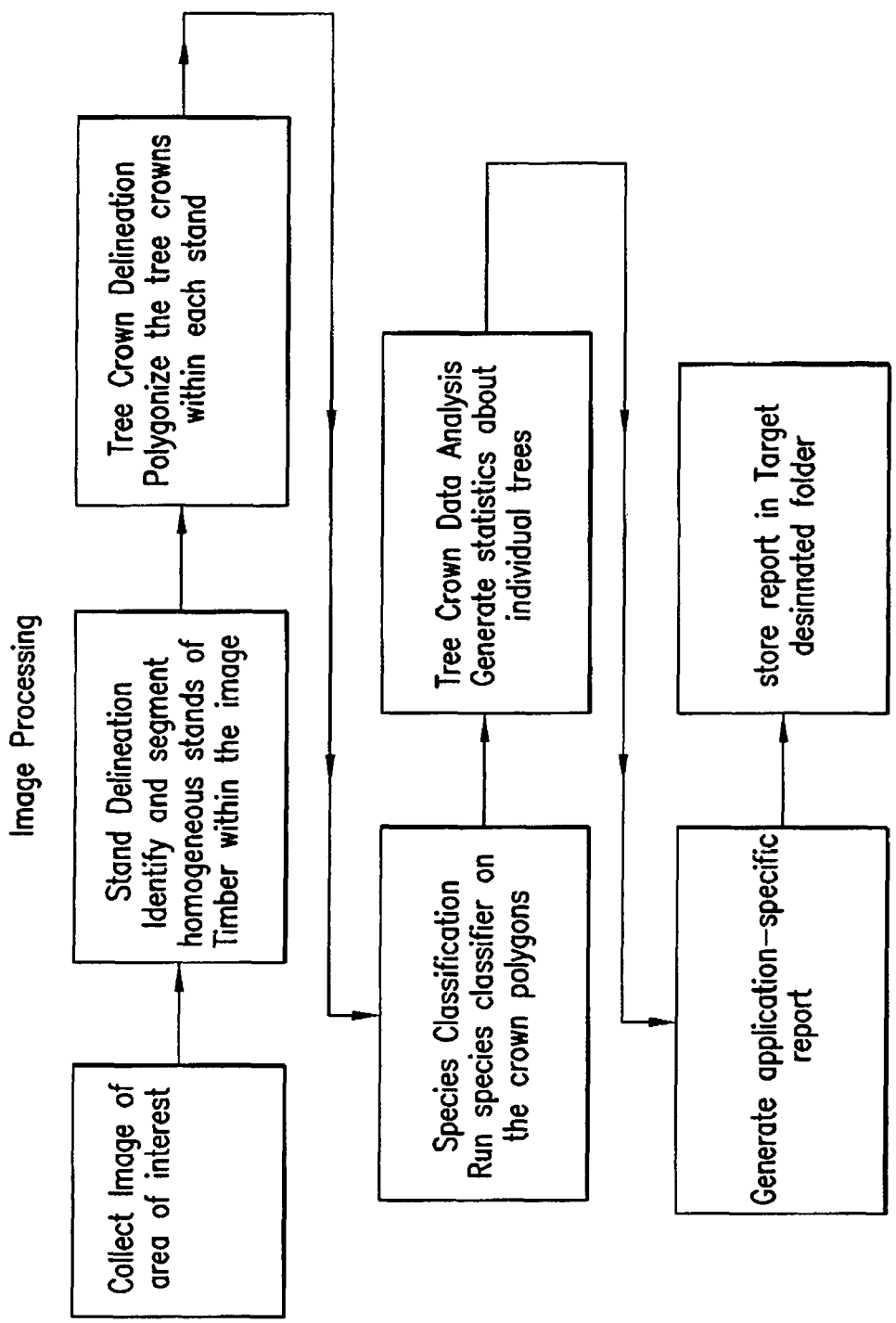
FIG. 10 is a schematic diagram illustrating the steps of an embodiment of a method of feature identification and analysis.
Figure 11:
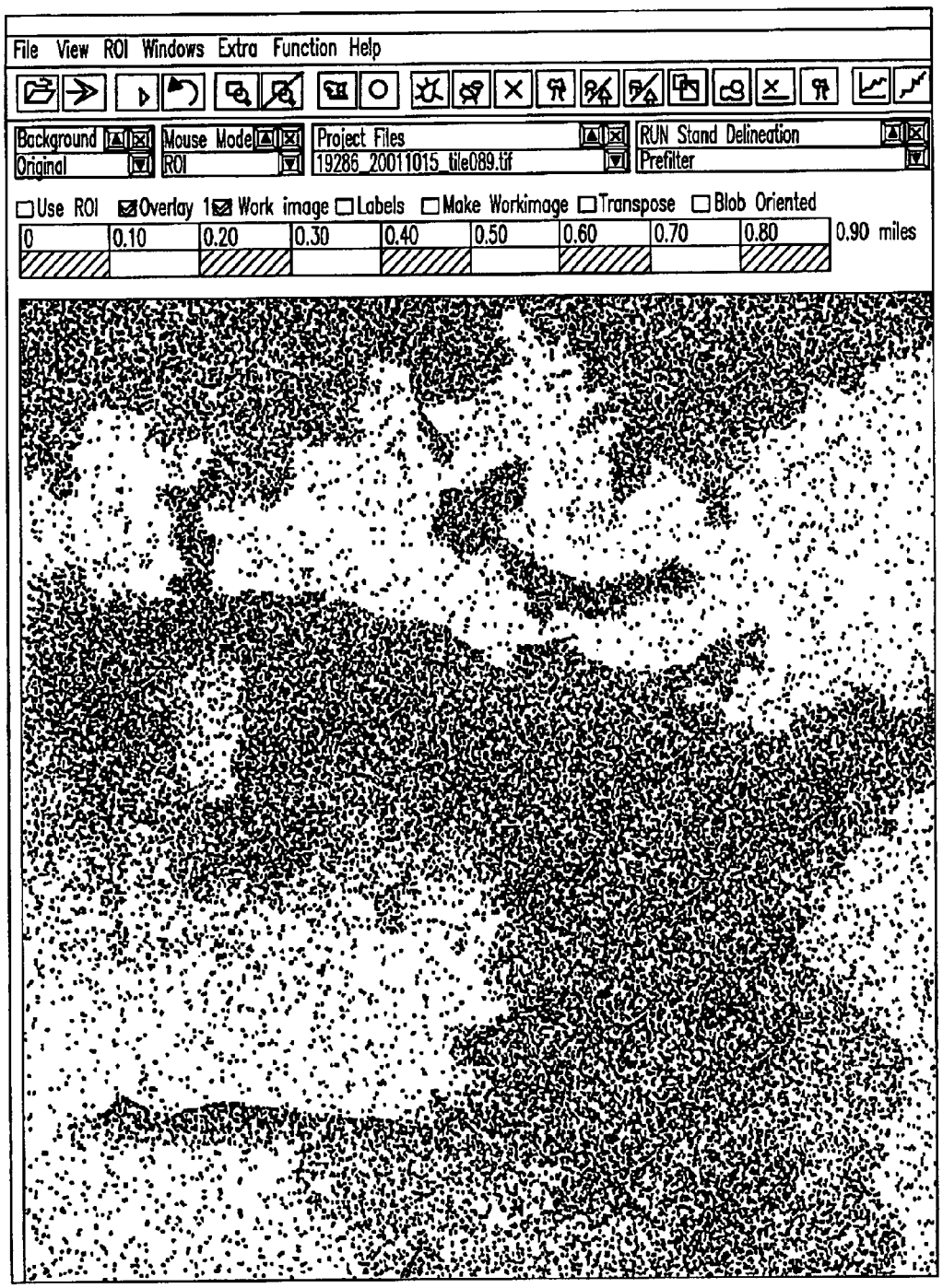
FIG. 11 is a digitized input image with a 2-4 meter/pixel resolution illustrating a 12 square mile forested area in Nicholas County, West Virginia.

According to one aspect of the current invention, segmentation by a seeded region growing method is performed to obtain a segmentation vector file of polygon boundaries for homogenous areas within the digital image, e.g., tree stands. Referring now to FIG. 11, an digital input image in a computer system is selected. As an input, a resolution where single features such as tree crowns cannot be detected is selected in this phase, for example, a 2-5 meter/pixel resolution. The image can be subsampled to reach the required resolution. For example, FIG. 10 illustrates a digitized image using a 2-4 meter/pixel resolution. A prefilter may be used to eliminate unwanted details. The prefilter value is the size of the discrete gaussian filter mask required to eliminate specific details and is preferably between 0 and 30. More particularly, the prefilter value is the size of the discrete Gaussian. The prefilter value of N pixels means the filtering is equivalent of applying a 3×3 filter N times, for example the 3×3 filter:

| | | |
|---|---|---|
| 1 | 2 | 1 |
| 2 | 4 | 2 |
| 1 | 2 | 1 |

This describes the size of the discrete Gaussian filtering required to eliminate specific details and is preferably between 0 and 30.

If desired, a gradient image analysis is performed to identify homogenous areas within the input image. According to one embodiment of the method, gradient image analysis is performed by replacing the digital image with a new image corresponding to the greyscale gradient values of the image. A "seed point" is planted at the center of each region that has similar color/grayscale values. The similarity is measured in the gradient image, where a "postfilter" parameter specifies a gradient window size, where a window is the distance between the center and outer pixel that are selected by the algorithm to calculate the gradient. Preferable windows for segmentation of forested regions range from 1 to 30, preferably 15 depending on the resolution of the digital image and the separation of the trees imaged. The pixel with the lowest gradient is assigned the segment's seed point, and a homogenous region is grown from the seed points by adding pixels into the segments in the minimum change direction among all segments in the image. The added pixels must be next to an existing segment in any current phase. Adding pixels is continued until the entire image has been saturated according to the seeded region growing method and all pixels belong to a segment, and. pixels at the borders of the segments represent the segment polygons. Boundary lines are drawn around the homogenous areas grown. Aggregate feature segmentation according to one embodiment is preferably performed on input images of high resolution, 0.4 to 1.5 m/pixel.

Figure 12:
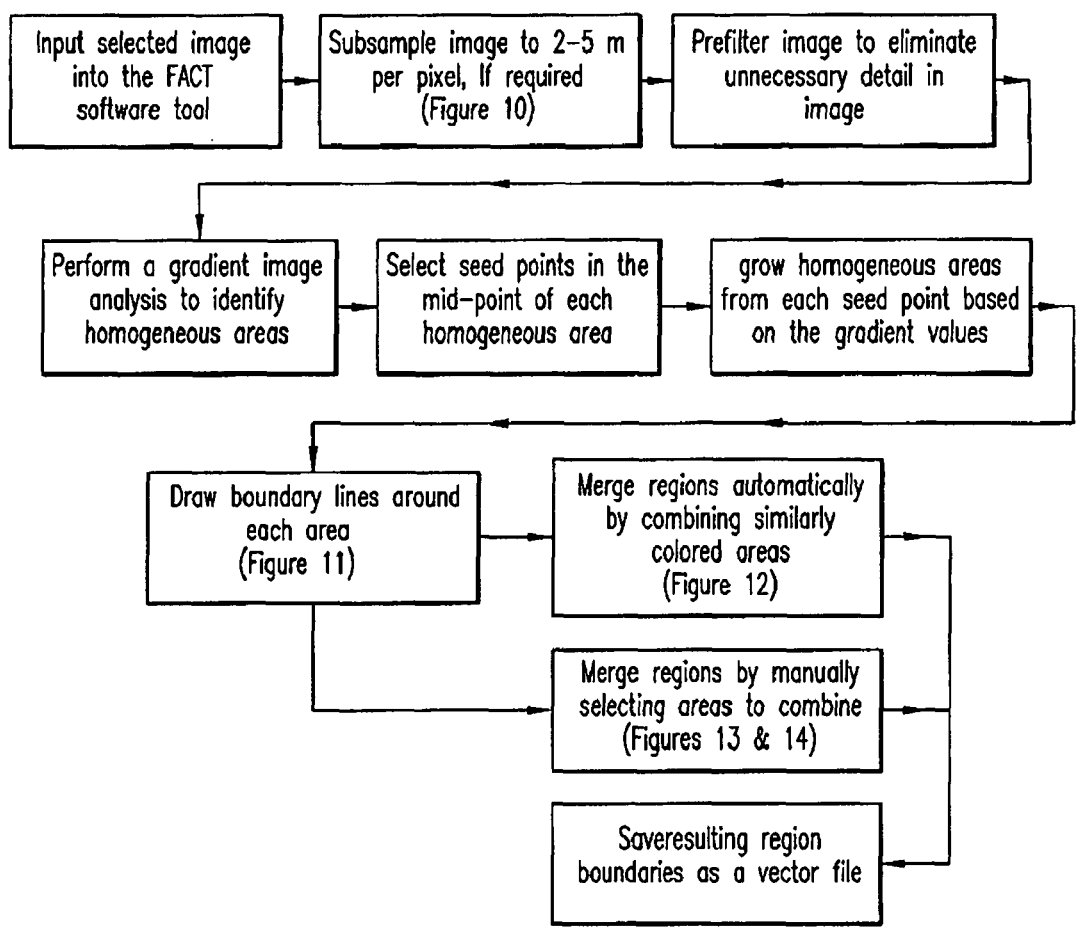
FIG. 12 is a flow chart of the step of high level segmentation of tree stands from a digital input image.
Figure 13:
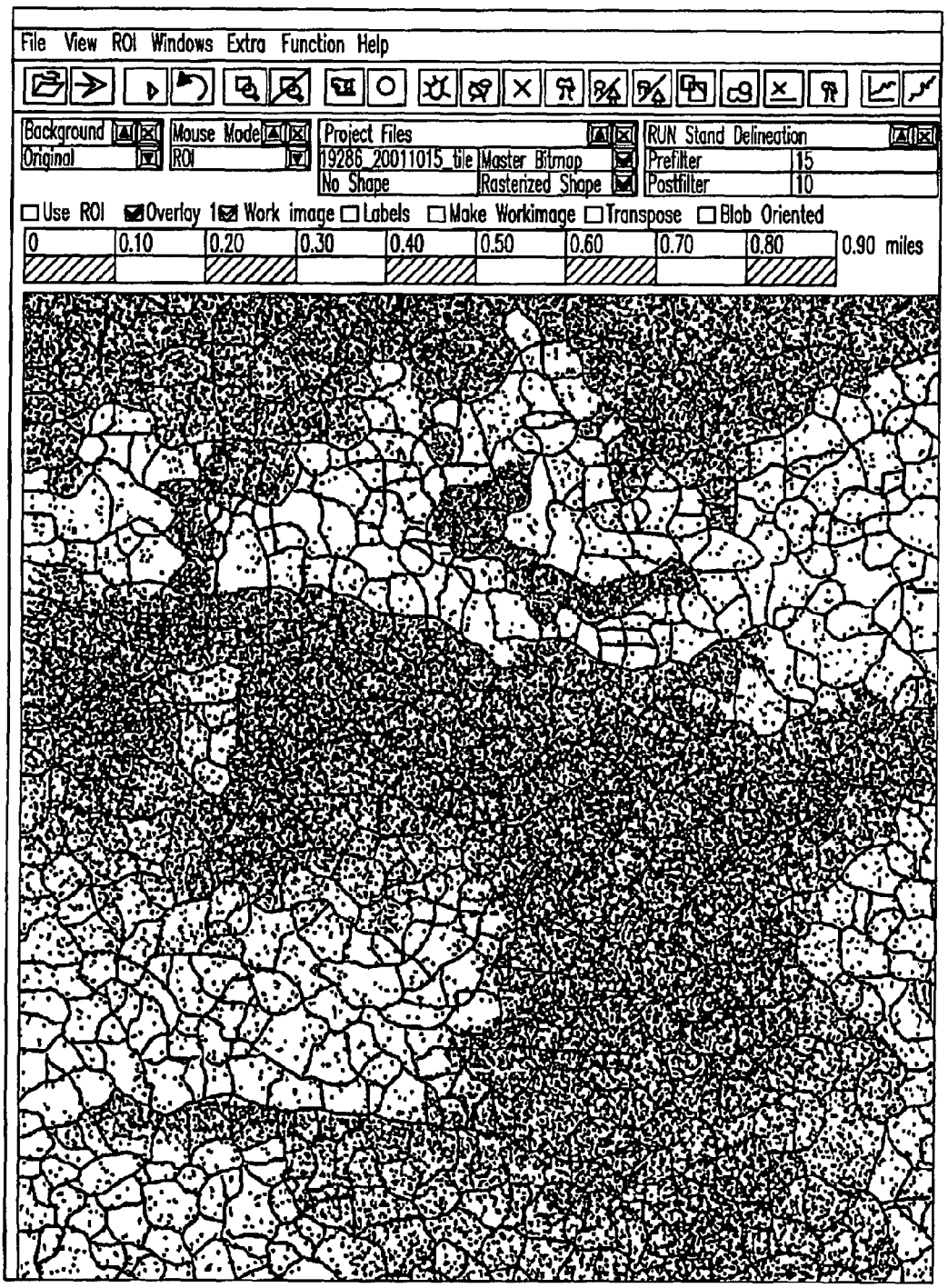
FIG. 13 illustrates an example of a digital image output using a computer video monitor, overlaid with the polygon image produced by the step of high level tree stand segmentation.

Accordingly, segment boundary lines, or polygons, are formed around the homogenous segments which are preferably polygonal in shape, as indicated in FIG. 12. However it is recognized that the scope of the present method is not limited by the embodiments presented herein.

Where first performed by an automatic or unsupervised algorithm, segmentation may preferably be adjusted using unsupervised and/or manual adjustment of the segmented image file. Referring once again to FIG. 11, automatic unsupervised segmentation adjustment is performed by adjusting the algorithm's filter threshold, which, upon reapplication of the segmentation algorithm, produces an the image as the merging together the neighboring segments of the previous phase, i.e., if their average color or texture feature is similar enough compared to a given threshold value. This phase can be done one or several times until the result is satisfactory. This phase is illustrated on FIG. 13 which shows the result of unsupervised segmentation adjustment performed on the stand delineation in FIG. 12. It would be recognized, however, by those skilled in the art that the source code is provided for exemplary purposes.

Figure 14:
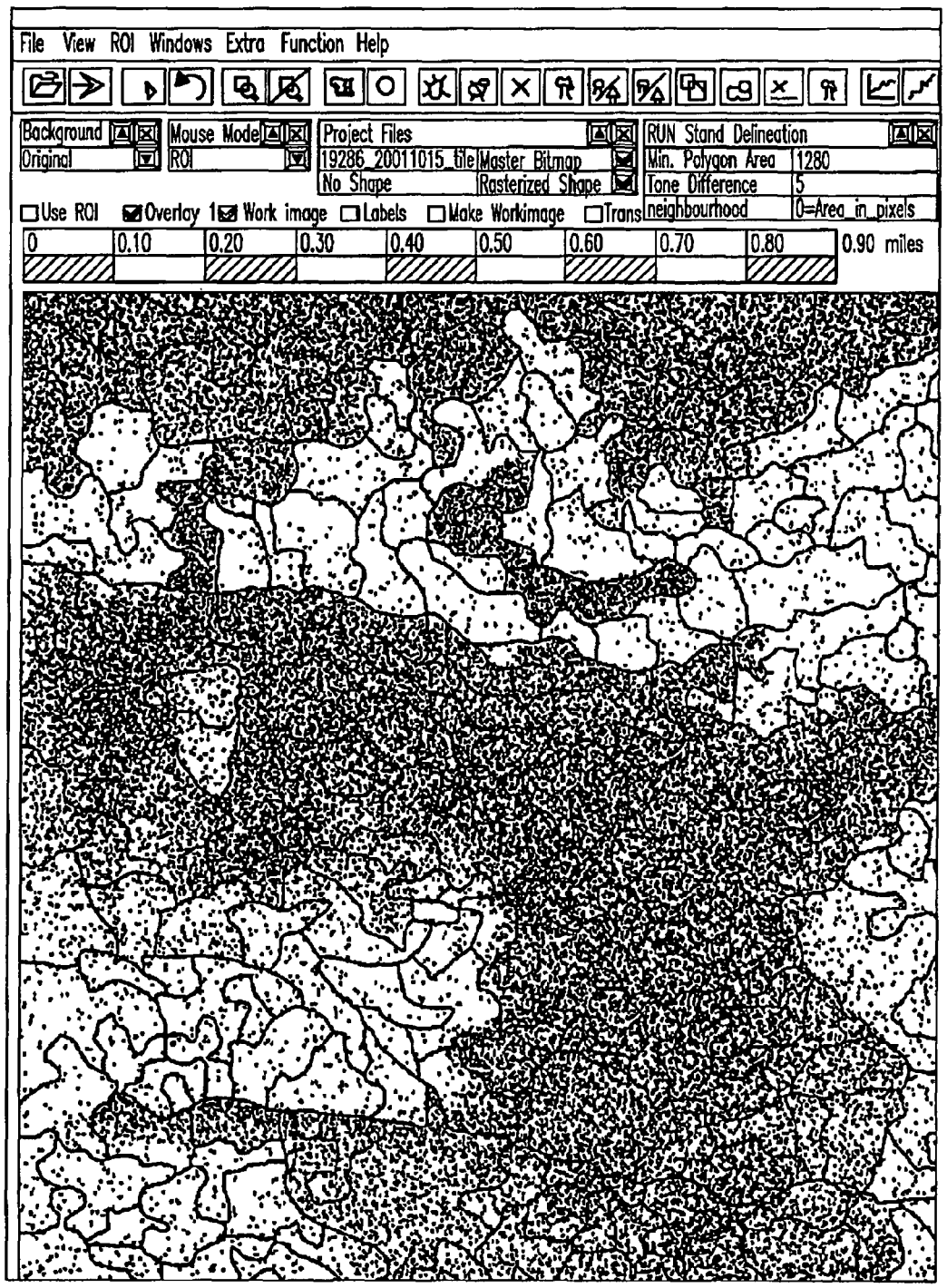
FIG. 14 illustrates the same input image as FIG. 4, after unsupervised stand segmentation adjustment.
Figure 15:
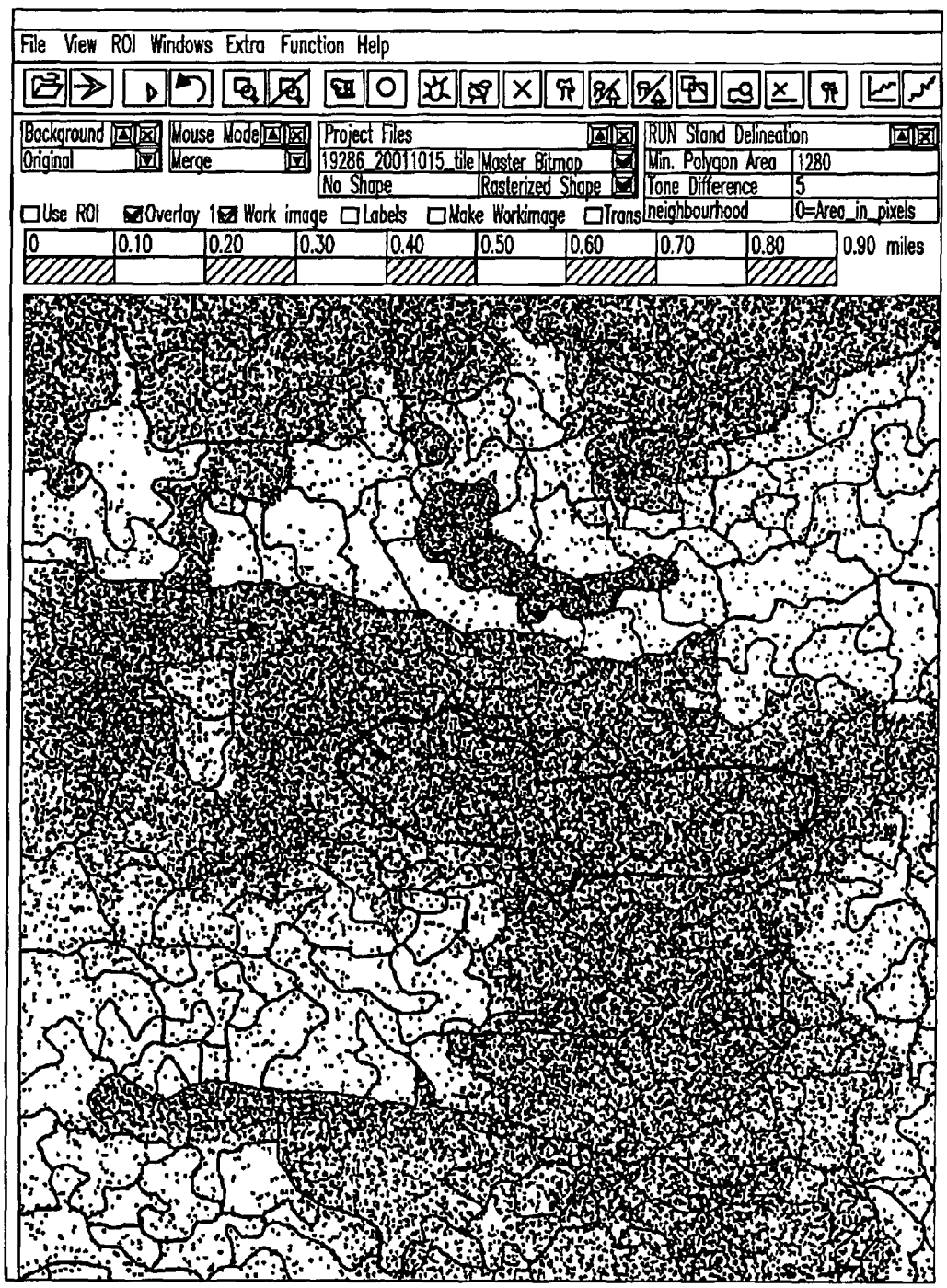
FIG. 15 illustrates manual stand segmentation adjustment by circumscribing a line through tree stand segment polygon borders, such that the portion of the polygon circumscribed is removed from the segmentation image and file.

Manual segmentation adjustment is performed by user selection of two or more neighboring segment polygons by drawing a line touching segment polygon borders using a mouse or other computer pointing device. Alternatively, the user drawn line may be connected at the start and end points and all segments that have points common with the line or that lie within the center of the line with connected start and end points will be merged. Manual segmentation adjustment is indicated in FIGS. 14 and 15. FIG. 14 depicts a user drawn line across segment polygon boundaries. FIG. 15 depicts a resulting larger homogenous segment.

The resulting segmented image file is stored in a vector file and can be displayed as an overlay or layer on the input image using ordinary display means. The segmented boundaries are stored in vector file format, such that the resulting layer can be drawn onto the original input image and/or rectified into any map coordinate system.

According to another embodiment of the present invention, no segmentation is required and a known boundary around an area on an input image is used to further analyze features within the image.

Low Level Segmentation

Figure 17:
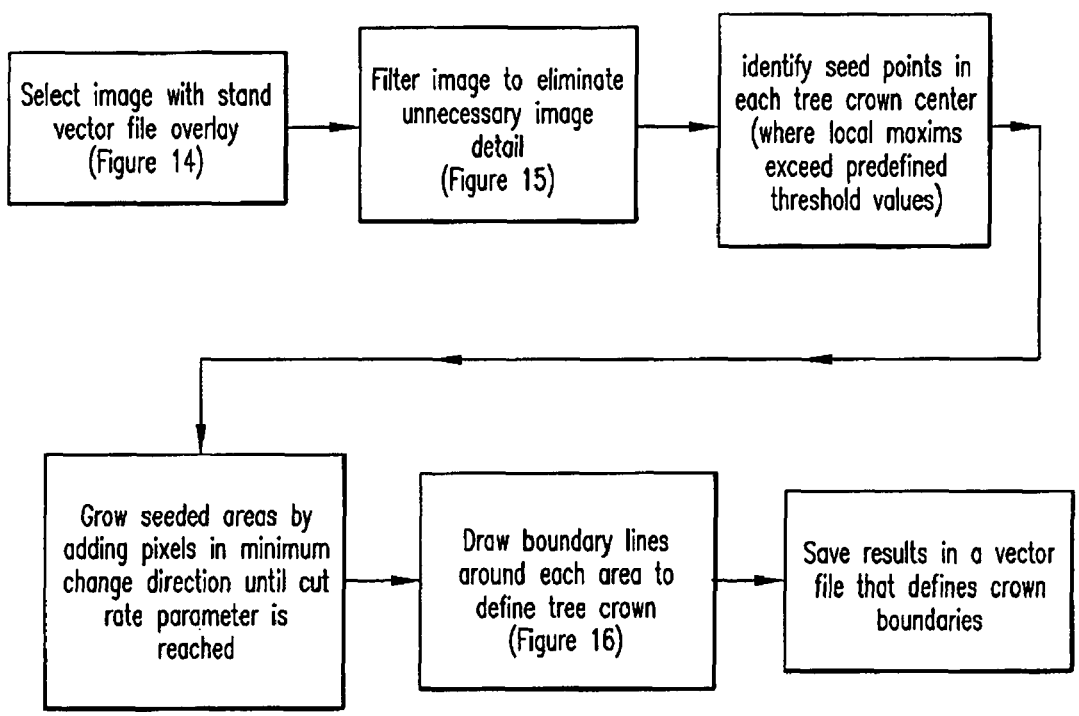
FIG. 17 is a flow chart of low level tree crown segmentation.
Figure 18:
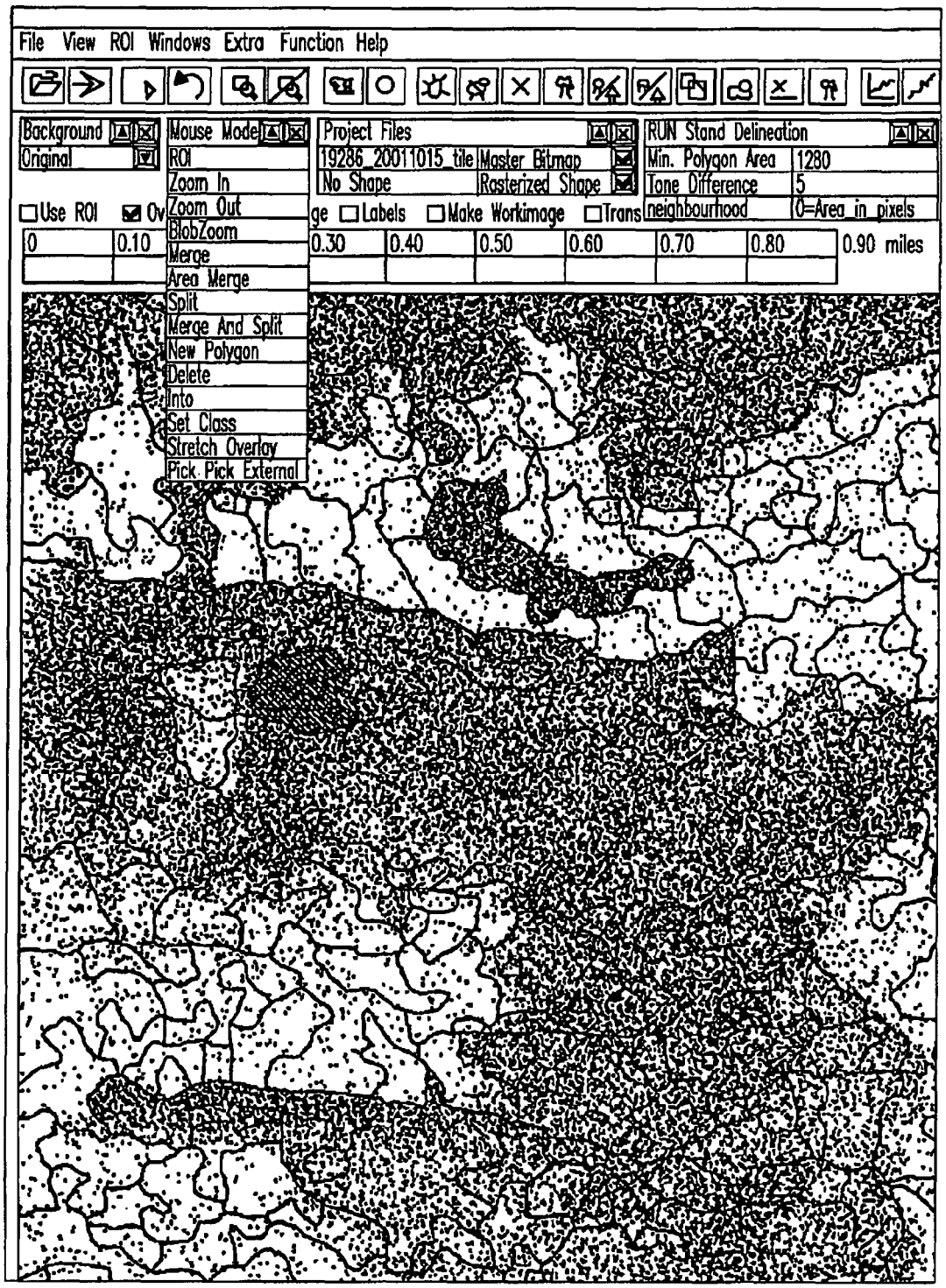
FIG. 18 illustrates user selection of a stand vector file for tree crown delineation, species classification, and data analysis.
Figure 19:
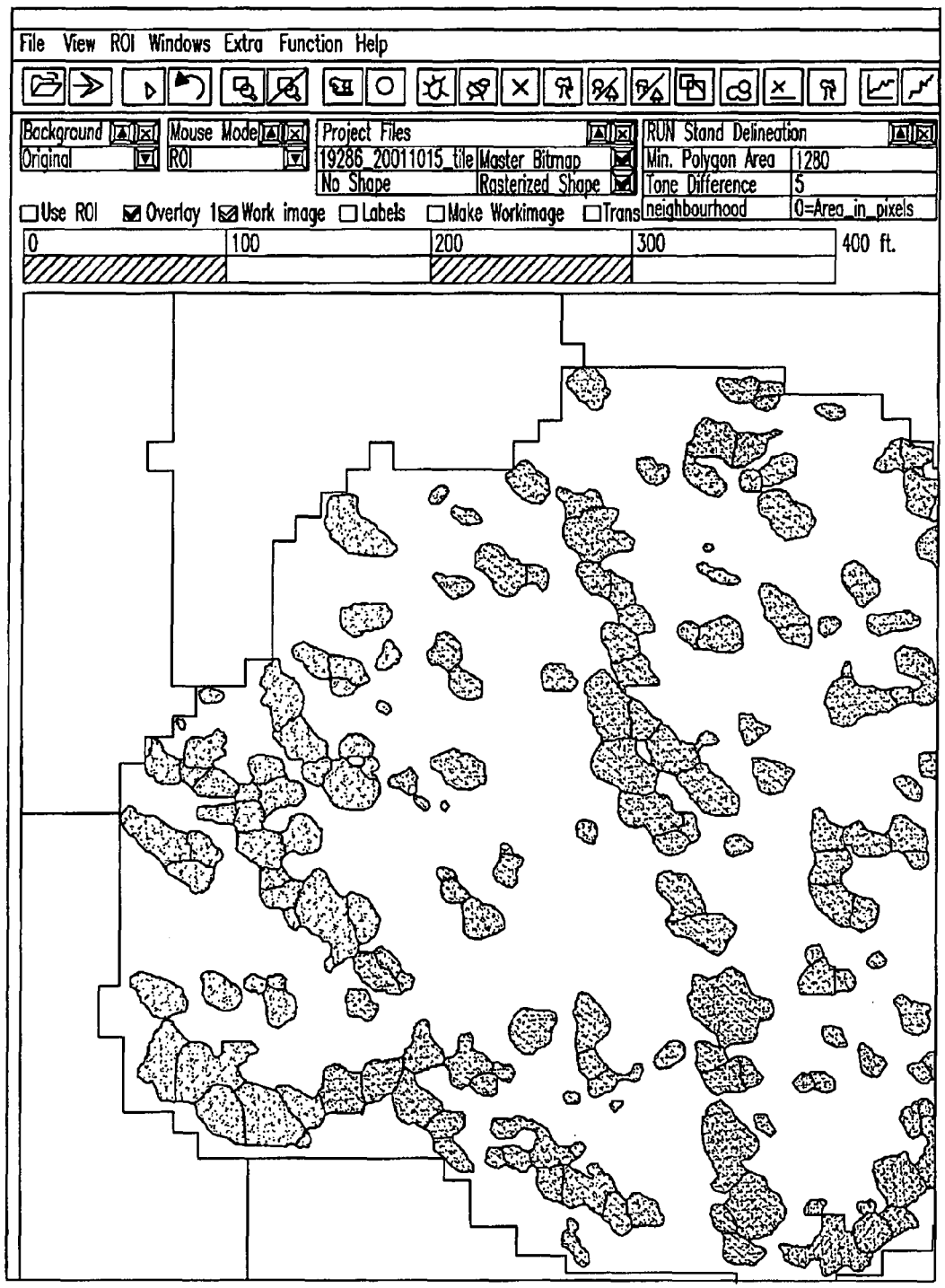
FIG. 19 illustrates the selected stand vector file before low level segmentation.
Figure 20:
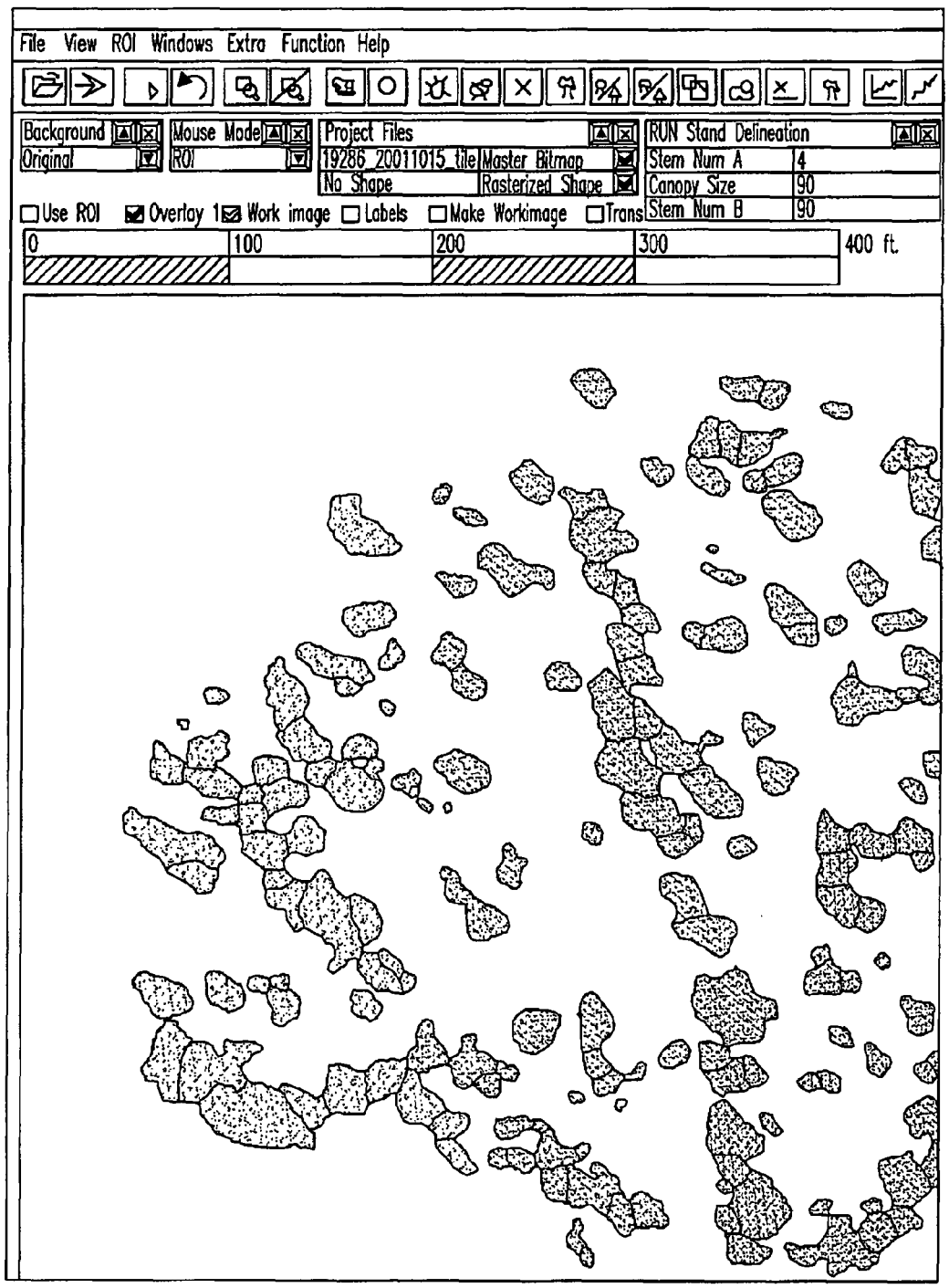
FIG. 20 illustrates low level tree crown segmentation using control parameters.

According to one aspect of the current invention, low level segmentation, or individual feature segmentation is performed on a segment selected from the high level segmentation file. Referring to FIGS. 17 and 18, a stand vector file overlay is selected. According to one aspect of the present invention, individual tree crowns are segmented using seeded region growing. As illustrated in FIG. 19, within a user selected tree stand, filtering may be necessary if the image is detailed and only analysis of specific tree crowns is desired. Preferably, control parameters are used to delineate only those tree crowns associated with a certain type, species or other parameter. A prefilter may be used to eliminate unwanted details. For example, CIR, or multispectral imagery bands represented by the red/green/blue (RGB) values of the target color may be used if certain color trees are to be segmented. The prefilter value is the size of the discrete gaussian filter mask required to eliminate specific details and is preferably between 0 and 30.

Additionally, a seed threshold may be selected as the threshold value of a given local maximum corresponding to a RGB, luminance, or another color space, which is used as a seed point from which to begin growing the low level segment according to a seeded region growing algorithm. The seed threshold in 8 bit images is between 0 and 256, preferably between 30 and 100. Alternatively, the seed threshold is another color parameter. Optionally, a cut ratio may also be used to filter out features on the image that will be considered background and left outside the remaining segments or individual tree crowns. The cut ratio is a threshold greyscale value of background, using the lowest grayscale value in the used color space that should be included in the segments. Values lower than this cut ratio will be considered as background and left outside the growing segments. The cut ratio in 8 bit images is between 0 and 256, preferably between 30 and 100. Alternatively, the cut ratio is another color parameter.

According to one embodiment of the present invention, seed points are placed at local maxims on the image that are brighter than a given threshold value. The brightness can be measured in luminance value of the image or some of the channels, or in a greyscale layer created using channel transformation based on channel information such as the calculated distance from a given color value in RGB, hue, saturation, or luminance-space and using that as the new greyscale value. This method makes it possible to find trees of a certain color and exclude other trees that have different color. Beginning from the seed points, individual low level segments are grown by adding pixels into the segments in the minimum change direction in the given greyscale layer, among all segments in the image. The added pixels must be next to the existing segment in any current phase. Adding pixels is continued until the given cut ratio parameter value in the given greyscale space is achieved or the entire image has been saturated and all pixels belong to a segment. Boundary lines are drawn around each resulting segment, such as a delineated tree crown. Tree crown segments from low level segmentation are illustrated on FIG. 20. This method of tree crown delineation generates complete boundaries around each tree crown, as opposed to partial boundaries, from which accurate and valuable physical tree data may be calculated.

Low level segmentation by seeded region growing and controlled filtering is performed according to methods described in the above-referenced related copending patent application.

Figure 16:
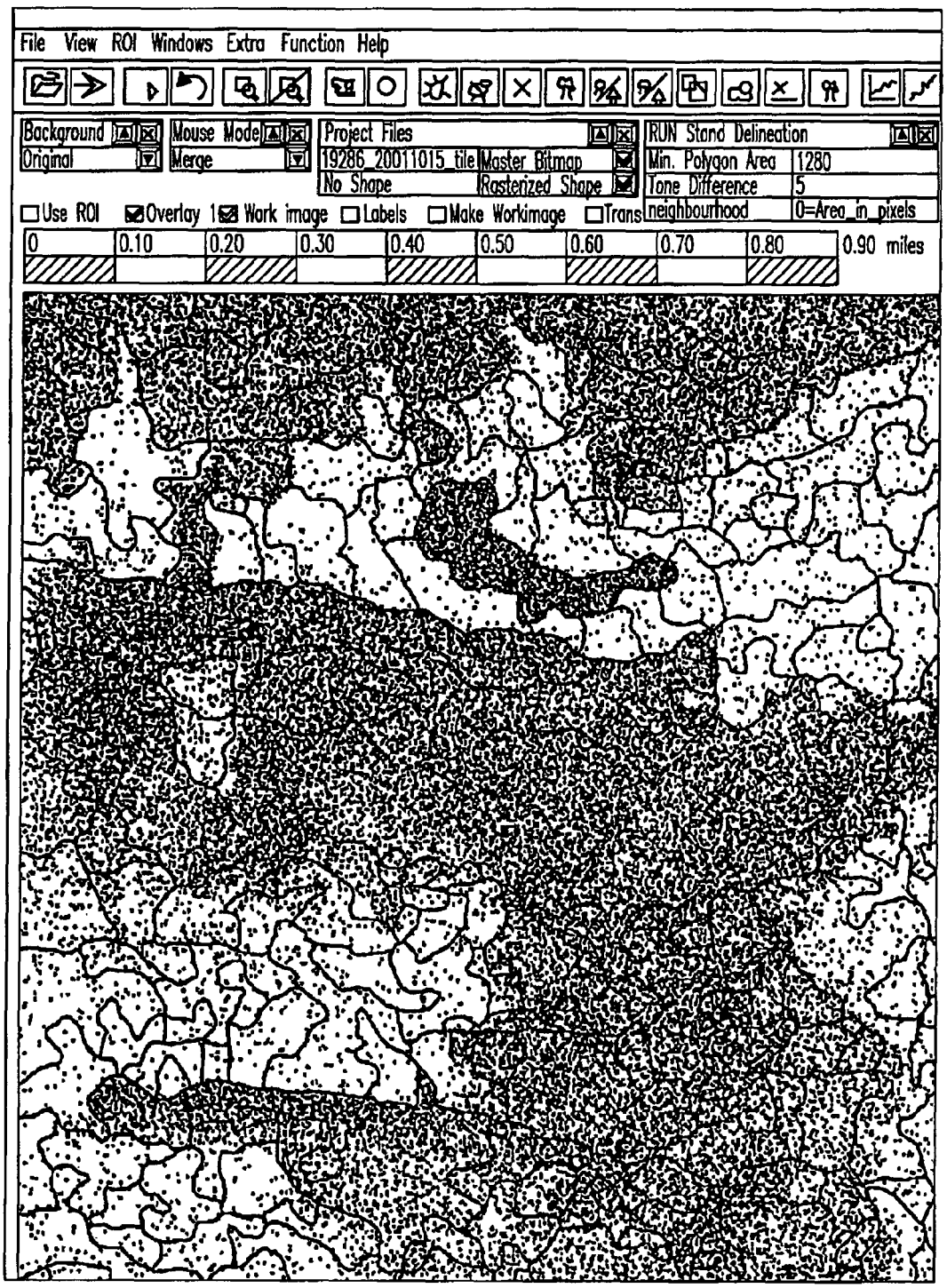
FIG. 16 illustrates the result of manual segmentation adjustment on FIG. 6.

The resulting vector file containing low level segments, such as tree crowns, is displayed as an overlay using ordinary display means. FIG. 16 illustrates an example of the resulting crown boundaries, and crown boundaries are stored in vector file format or a raster label map, such that the resulting layer can be viewed on the original input image and/or rectified to any map coordinate system.

Classification

Figure 21:
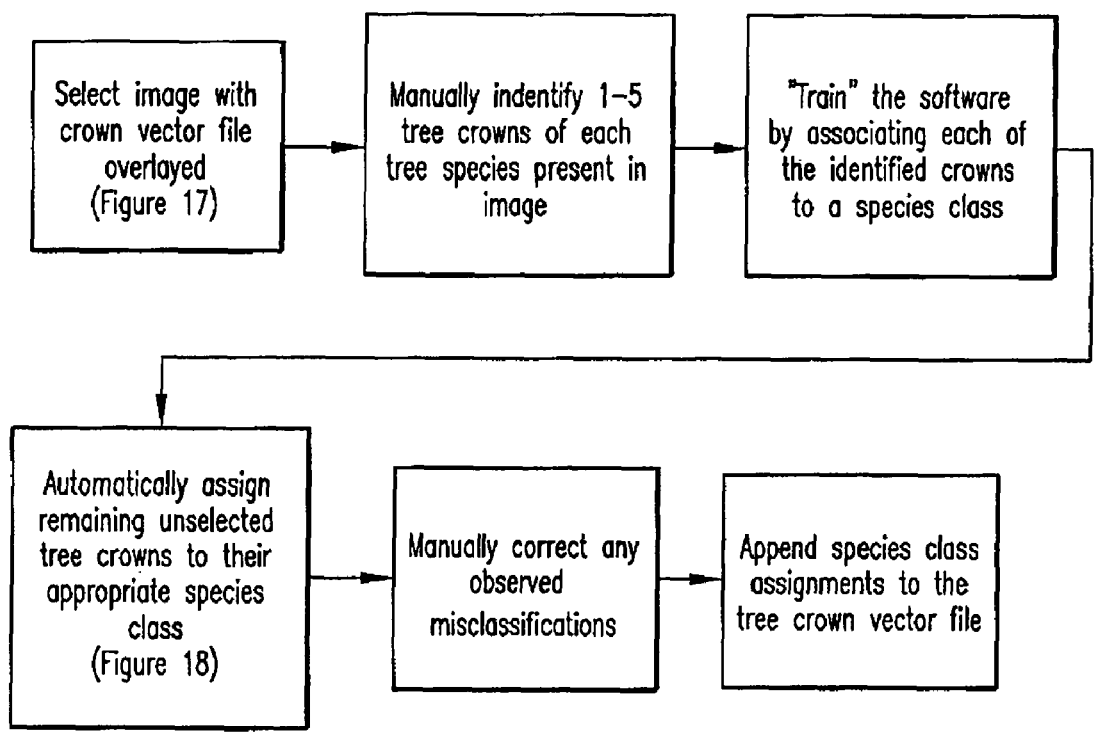
FIG. 21 is a species classification flow chart.
Figure 22:
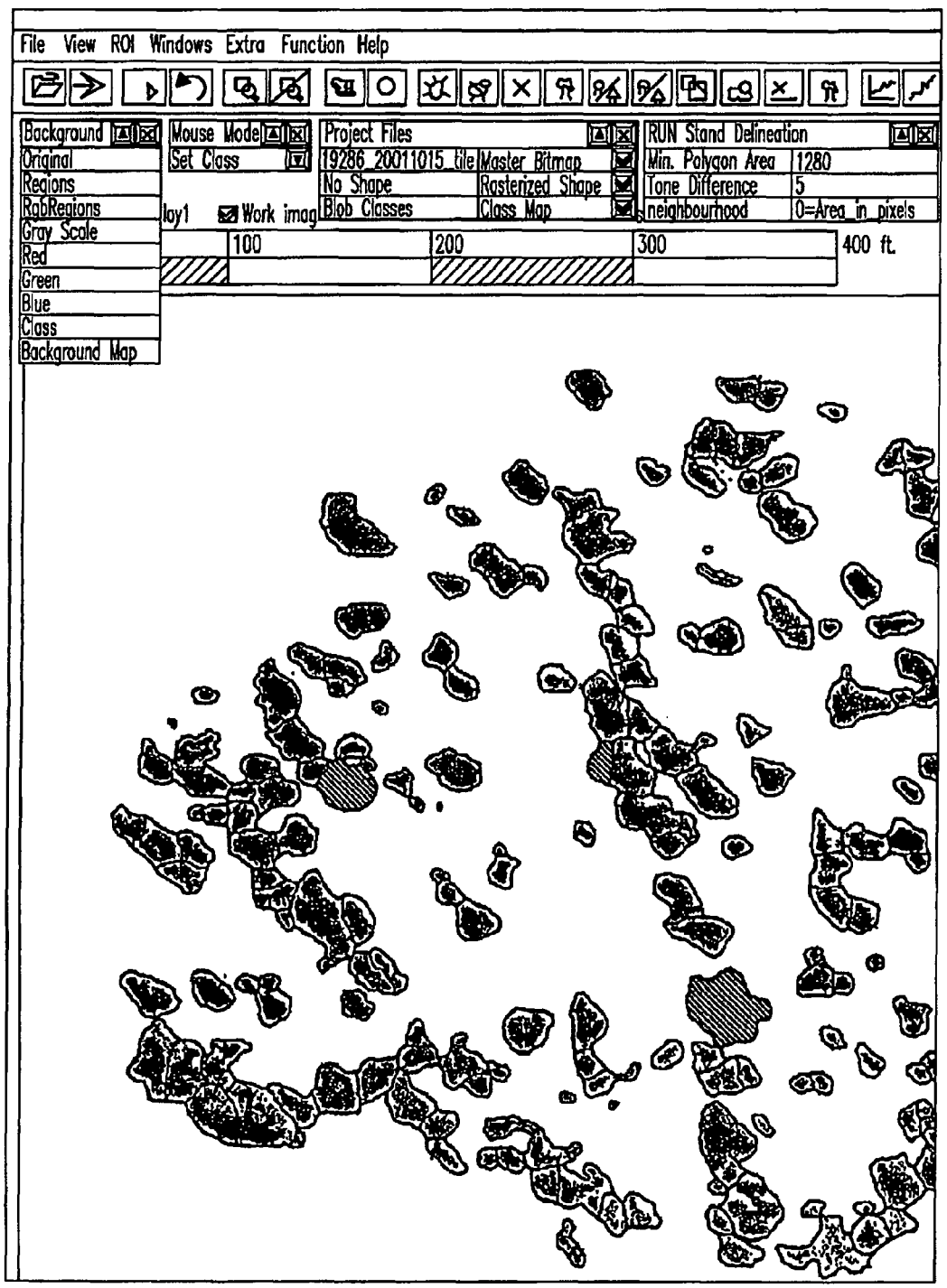
FIG. 22 illustrates a training procedure used in supervised tree crown species classification.

According to one aspect of the present invention, individual segments are classified according to species or class using supervised classification. Preferably, feature classification is performed on individual tree stands from a forestral digital image using a training procedure. Referring now to FIG. 21, a crown vector file overlay is selected. The user identifies tree crowns associated with specific tree species by manually selecting trees. Manual selection to create training sites, or user identified tree crowns, may be done by clicking on individual trees with a mouse or any other computer pointer device. The user identifies at least one tree crowns within a species, preferably 2-5 tree crowns. This training procedure is illustrated in FIGS. 21 and 22 which depicts three trees of a given species that have been manually selected. The number of training sites to be selected per species or class depends on the homogeneity of the individual delineated feature to be classified. For example, greater color homogeneity within a tree species on a particular tree crown vector file requires fewer training sites for that species. The user identifies up to 5 species within the crown vector file, preferably 1 to 5 species, more preferably 1 to 3 species. For each species identified, tree segment color, shape or texture measures are calculated to characterize the species. Preferably, the average color value of the tree crown segment or center location of the tree crown segment is used to characterize the species.

Figure 23:
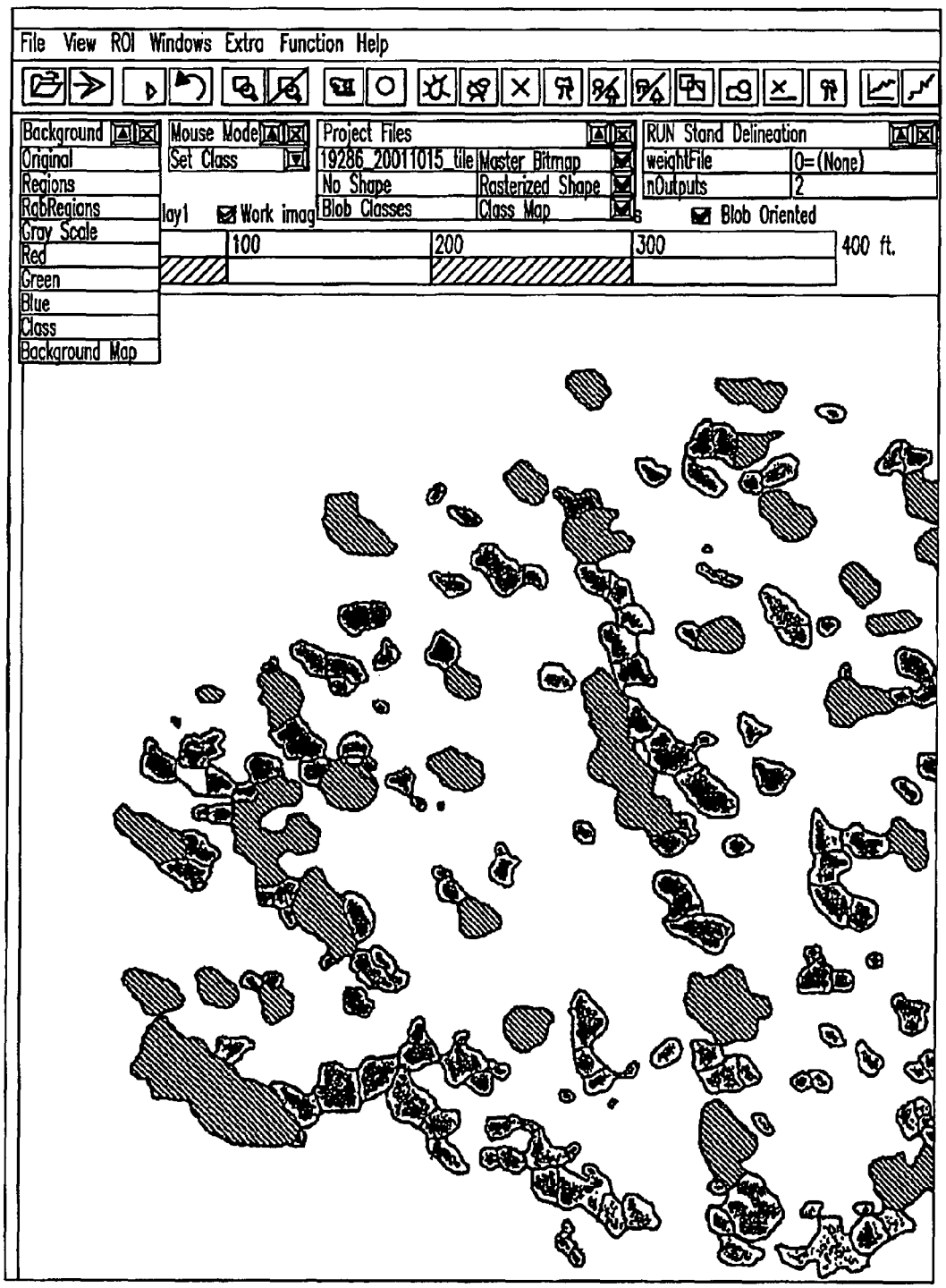
FIG. 23 illustrates computer assisted classification of unselected trees based on a training procedure and user selected training units.

Remaining unselected tree crowns that correspond to those feature values are recognized and classified accordingly, as shown in FIGS. 21 and 23. Classification is performed pursuant to any classification method known to one of ordinary skill in the art, preferably nearest neighborhood classification.

As indicated in FIG. 21, according to another embodiment of the invention, the user manually corrects the classification as necessary by manually classifying and/or reclassifying tree crowns based on manual observation of misclassifications.

The resulting classification information is stored in a vector file. Preferably, the species information is appended to the tree crown vector file.

Data Analysis

According to another aspect of the present invention, mathematical models are used to analyze additional attributes associated with segmented and classified features in aggregate segments. Preferably, classified tree crowns within a homogenous tree stand are used for analysis. Crown correlation models are based on data obtained through field measurements based on species specific variables including, but not limited to, actual field measurement of tree crown size, DBH, volume, form class, and height. Models are stored in a database or model file, e.g. in XML format. Table 1 illustrates the Norway Spruce Model, which may be commonly used in analysis of Appalachian regions:

TABLE 1

```
<xml>
    <modform version="2.0" fileref="19301_20011019_tile003.tif">
        <modgroups>
            <mgroup name="Models210801">
                <mclass name="IHC2906" diam="HMA11" height="HMA21" vol="HMA31" color="0"/>
                <mclass name="ASH" diam="ASH11" height="ASH21" vol="ASH31"/>
                <mclass name="Cherry" diam="Cherry11" height="Cherry21" vol="Cherry31" color="80FFFF"/>
                <mclass name="HMA" diam="HMA11" height="HMA21" vol="HMA31" color="4080FF"/>
                <mclass name="Poplar" diam="ASH11" height="Poplar21" vol="Poplar31" color="80FFFF"/>
                <mclass name="RedOak" diam="Redoak11" height="Redoak21" vol="Redoak31" color="FF"/>
                <mclass name="WhiteOak" diam="Whiteoak11" height="Whiteoak21" vol="Whiteoak31" color="FFFFFF"/>
                <mclass name="RMA" diam="RMA11" height="RMA21" vol="RMA31" color="800080"/>
                <mclass diam="IHC2906" height="IHCOoakHght" vol="IHCHeight" name="" color="0"/>
            </mgroup>
        </modgroups>
        <models>
            <diameter>
                <model id="1" name="ASH11" formula="Square Root-X" inpunit1="ft2" outunit="inch">
                    <param id="1" val="5.847"/>
                    <param id="2" val="0.735"/>
                </model>
                <model id="1" name="Cherry11" formula="Square Root-X" inpunit1="ft2" outunit="inch">
                    <param id="1" val="3.217"/>
                    <param id="2" val="0.765"/>
                </model>
                <model id="1" name="HMA11" formula="Square Root-X"
```

TABLE 1-continued

```
inpunit1="ft2" outunit="inch">
                <param id="1" val="3.192"/>
                <param id="2" val="0.69"/>
            </model>
            <model id="1" name="RMA11" formula="Square Root-X"
inpunit1="ft2" outunit="inch">
                <param id="1" val="3.192"/>
                <param id="2" val="0.69"/>
            </model>
            <model id="1" name="Poplar11" formula="Square Root-X"
inpunit1="ft2" outunit="inch">
                <param id="1" val="1.068"/>
                <param id="2" val="0.86"/>
            </model>
            <model id="1" name="Redoak11" formula="Square Root-X"
inpunit1="ft2" outunit="inch">
                <param id="1" val="2.034"/>
                <param id="2" val="0.86"/>
            </model>
            <model id="1" name="Whiteoak11" formula="Square Root-
X" inpunit1="ft2" outunit="inch">
                <param id="1" val="3.523"/>
                <param id="2" val="0.79"/>
            </model>
            <model id="1" name="IHC2906" formula="Naeslund"
inpunit1="ft2" outunit="inch">
                <param id="1" val="1.651"/>
                <param id="2" val="0.2006"/>
                <param id="3" val="0.0000"/>
            </model>
            <model id="1" name="IHCoak" formula="Square Root-X"
inpunit1="ft2" outunit="inch">
                <param id="1" val="21.9397"/>
                <param id="2" val="3.1726"/>
                <param id="3" val="0.00000"/>
            </model>
        </diameter>
        <height>
            <model id="1" name="ASH21" formula="Linear"
inpunit1="inch" outunit="ft" xmin1="3">
                <param id="1" val="43.182"/>
                <param id="2" val="1.882"/>
            </model>
            <model id="1" name="Cherry21" formula="Linear"
inpunit1="inch" outunit="ft" xmin1="3">
                <param id="1" val="27.021"/>
                <param id="2" val="2.274"/>
            </model>
            <model id="1" name="HMA21" formula="Linear"
inpunit1="inch" outunit="ft" xmin1="3">
                <param id="1" val="33.074"/>
                <param id="2" val="1.946"/>
            </model>
            <model id="1" name="RMA21" formula="Linear"
inpunit1="inch" outunit="ft" xmin1="3">
                <param id="1" val="33.074"/>
                <param id="2" val="1.946"/>
            </model>
            <model id="1" name="Poplar21" formula="Linear"
inpunit1="inch" outunit="ft" xmin1="3">
                <param id="1" val="43.41"/>
                <param id="2" val="2.3"/>
            </model>
            <model id="1" name="Redoak21" formula="Logarithmic-X"
inpunit1="inch" outunit="ft" xmin1="3">
                <param id="1" val="1.533"/>
                <param id="2" val="22.236"/>
            </model>
            <model id="1" name="Whiteoak21" formula="Linear"
inpunit1="inch" outunit="ft" xmin1="3">
                <param id="1" val="36.718"/>
                <param id="2" val="1.5"/>
            </model>
            <model id="1" name="IHC2906" formula="Linear"
inpunit1="inch" outunit="ft" xmin1="3">
                <param id="1" val="28.2382"/>
                <param id="2" val="1.5075"/>
                <param id="3" val="0.0000"/>
            </model>
            <model id="1" name="IHCOoakHght" formula="Naeslund"
```

TABLE 1-continued

```
inpunit1="inch" outunit="ft" xmin1="3">
                <param id="1" val="2.7434"/>
                <param id="2" val="0.1947"/>
                <param id="3" val="0.0000"/>
            </model>
        </height>
        <volume>
            <model id="2" name="ASH31" formula="Square Root-Y"
inpunit1="inch" inpunit2="ft" outunit="bf" xmin1="3">
                <param id="1" val="-16.058"/>
                <param id="2" val="1.5"/>
            </model>
            <model id="2" name="Cherry31" formula="Square Root-Y"
inpunit1="inch" inpunit2="ft" outunit="bf" xmin1="3">
                <param id="1" val="-13.161"/>
                <param id="2" val="1.427"/>
            </model>
            <model id="2" name="HMA31" formula="Square Root-Y"
inpunit1="inch" inpunit2="ft" outunit="bf" xmin1="3">
                <param id="1" val="-13.598"/>
                <param id="2" val="1.49"/>
            </model>
            <model id="2" name="RMA31" formula="Square Root-Y"
inpunit1="inch" inpunit2="ft" outunit="bf" xmin1="3">
                <param id="1" val="-13.598"/>
                <param id="2" val="1.49"/>
            </model>
            <model id="2" name="Poplar31" formula="Square Root-Y"
inpunit1="inch" inpunit2="ft" outunit="bf" xmin1="3">
                <param id="1" val="-16.037"/>
                <param id="2" val="1.575"/>
            </model>
            <model id="2" name="Redoak31" formula="Square Root-Y"
inpunit1="inch" inpunit2="ft" outunit="bf" xmin1="3">
                <param id="1" val="-13.3"/>
                <param id="2" val="1.449"/>
            </model>
            <model id="2" name="Whiteoak31" formula="Square Root-
Y" inpunit1="inch" inpunit2="ft" outunit="bf" xmin1="3">
                <param id="1" val="-13.008"/>
                <param id="2" val="1.42"/>
            </model>
            <model id="2" name="undefined" formula="Square Root-
Y" inpunit1="inch" inpunit2="ft" outunit="bf" xmin1="3">
                <param id="1" val="-13.3"/>
                <param id="2" val="1.38"/>
            </model>
            <model id="2" name="IHCHeight" formula="Square Root-
Y" inpunit1="inch" inpunit2="ft" outunit="bf" xmin1="3">
                <param id="1" val="-0.8110"/>
                <param id="2" val="0.0525"/>
                <param id="3" val="0.0000"/>
            </model>
        </volume>
    </models>
    <formulas>
        <formula id="1" name="Naeslund">
            <add>
                <div>
                    <mul>
                        <var inx="1"/>
                        <var inx="1"/>
                    </mul>
                    <mul>
                        <add>
                            <coeff inx="1"/>
                            <mul>
                                <coeff inx="2"/>
                                <var inx="1"/>
                            </mul>
                        </add>
                        <add>
                            <coeff inx="1"/>
                            <mul>
                                <coeff inx="2"/>
```

Any model that is commonly known in the art may be used to generate species specific data based on tree crown area. Examples of models commonly known in the art include Naeslund and Laasasenaho2.

Any variable may be included in the model, including but not limited to species, DBH, form class, tree quality or value. Models may be updated and altered depending on the species and region, and new models incorporated at any time into the model database.

Figure 24:
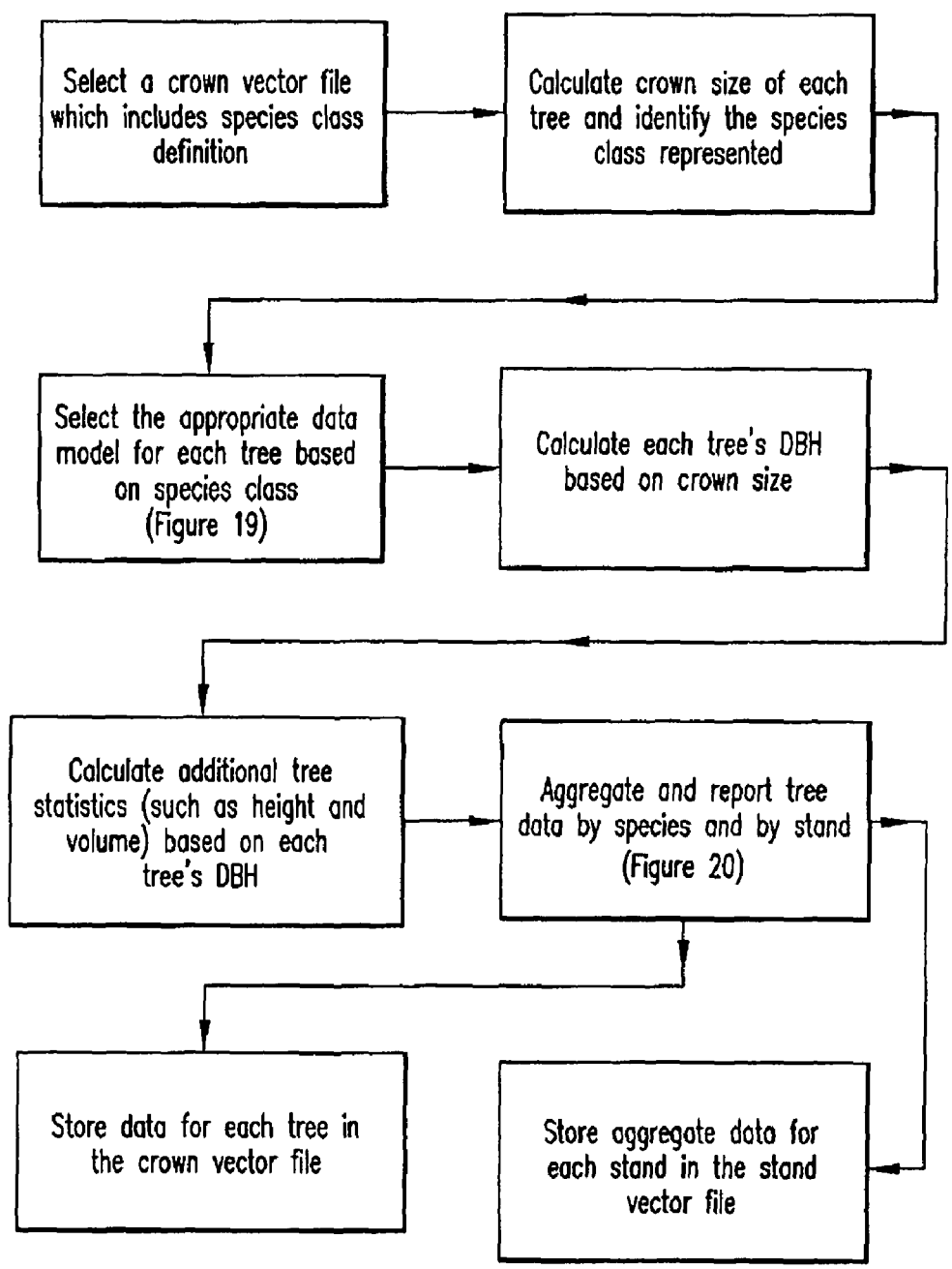
FIG. 24 is a data analysis flow chart.
Figure 25:
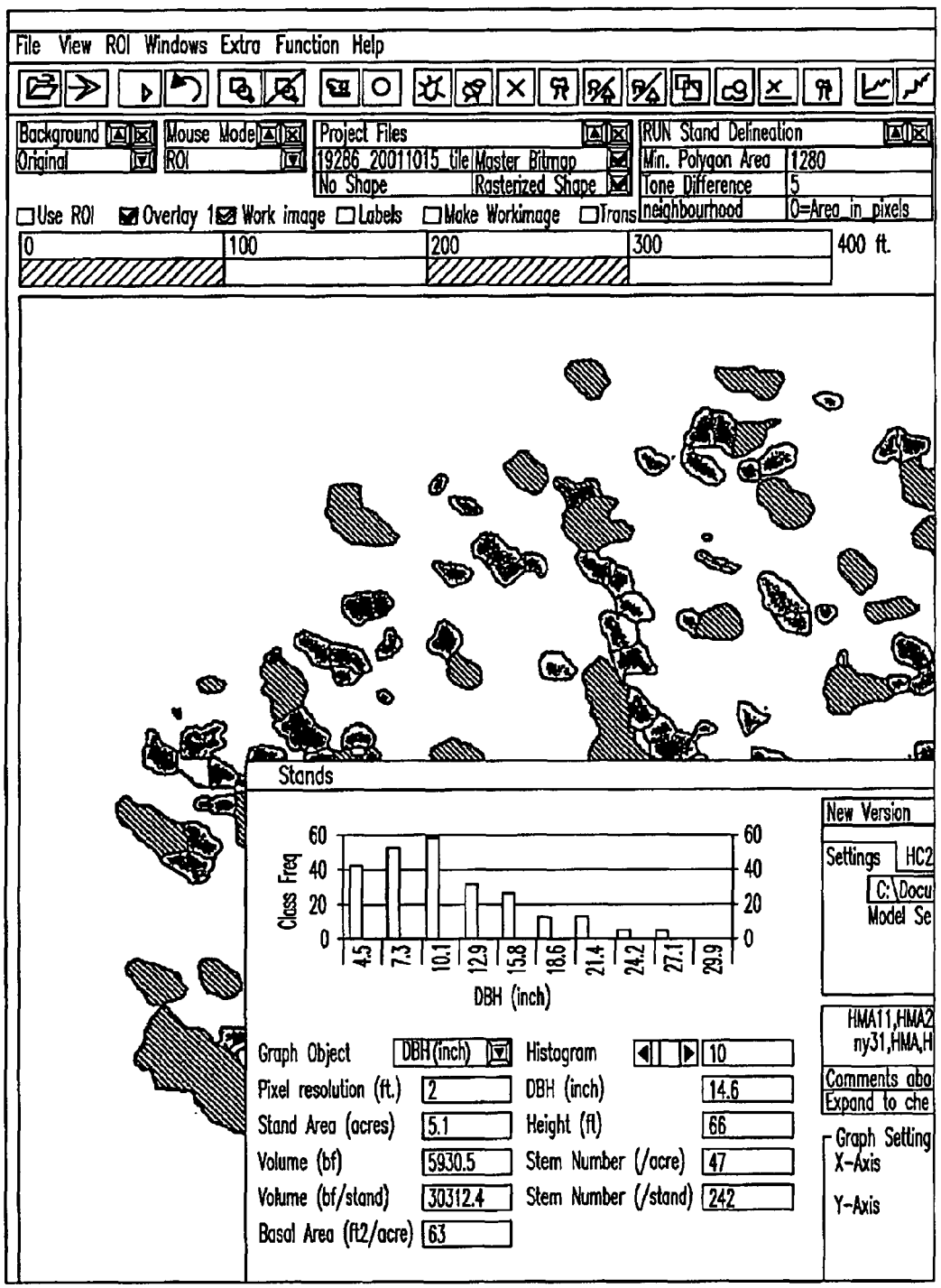
FIG. 25 illustrates a video monitor displayed data and image file containing data analysis results.

Referring now to FIG. 24, according to one embodiment of the present method, the user selects a crown vector file for analysis, calculates the crown size for each tree, and selects an appropriate data model that most closely represents the species depicted in the crown vector file and geographic location of the original input image. Using the model, each tree's DBH is calculated based on crown size. Additional aggregate tree stand and individual tree data is thereafter calculated, such as height and volume based on DBH, total breast height diameter distribution of trees, tree height distribution, tree stem number, tree stem number per hectare, total tree stem volume, and histogram distribution of trees by species, such histogram which can be adjusted by putting upper and lower limits on tree stem size. The reported data is displayed on ordinary display means, as illustrated in FIG. 25. Examples of physical data calculations are:

Diameter breast height=$(6.043*\text{sqrt}(A))+1.283$;

Tree Height=$\text{div}((A*A),((2.09000+(0.14050*A))*(2.09000+(0.14050*A))))+1.30000$; and Stem Volume=$000022927*\text{pow}(A,1.91505)*\text{pow}(0.99146,A)*\text{pow}(B,2.82541)*\text{pow}((B-1.3),-1.53547)$.

```
            <coeff inx="2"/>
          </pow>
        </mul>
      </formula>
      <formula id="1" name="Reciprocal-Y">
        <inv>
          <add>
            <coeff inx="1"/>
            <mul>
              <var inx="1"/>
              <coeff inx="2"/>
            </mul>
          </add>
        </inv>
      </formula>
      <formula id="1" name="Exponential">
        <exp>
          <add>
            <coeff inx="1"/>
            <mul>
              <var inx="1"/>
              <coeff inx="2"/>
            </mul>
          </add>
        </exp>
      </formula>
      <formula id="1" name="Reciprocal-X">
        <add>
          <coeff inx="1"/>
          <div>
            <coeff inx="2"/>
            <var inx="1"/>
          </div>
        </add>
      </formula>
      <formula id="1" name="Logarithmic-X">
        <add>
          <coeff inx="1"/>
```

-continued

```
          <mul>
            <coeff inx="2"/>
            <log>
              <var inx="1"/>
            </log>
          </mul>
        </add>
      </formula>
      <formula id="1" name="Square Root-X">
        <add>
          <coeff inx="1"/>
          <mul>
            <coeff inx="2"/>
            <sqrt>
              <var inx="1"/>
            </sqrt>
          </mul>
        </add>
      </formula>
      <formula id="1" name="Square Root-Y">
        <pow2>
          <add>
            <coeff inx="1"/>
            <mul>
              <coeff inx="2"/>
              <var inx="1"/>
            </mul>
          </add>
        </pow2>
      </formula>
      <formula id="1" name="2-Reciprocal">
        <inv>
          <add>
            <coeff inx="1"/>
            <div>
              <coeff inx="2"/>
              var inx="1"/>
            </div>
          </add>
        </inv>
      </formula>
      <formula id="1" name="S-Curve">
        <exp>
          <add>
            <coeff inx="1"/>
            <div>
              <coeff inx="2"/>
              <var inx="1"/>
            </div>
          </add>
        </exp>
      </formula>
      <formula id="1" name="Polynomical">
        <add>
          <coeff inx="3"/>
          <mul>
            <coeff inx="1"/>
            <var inx="1"/>
          </mul>
          <mul>
            <coeff inx="2"/>
            <pow2>
              <var inx="1"/>
            </pow2>
          </mul>
        </add>
      </formula>
    </formulas>
  </modform>
```

Any model that is commonly known in the art may be used to generate species specific data based on tree crown area. Examples of models commonly known in the art include Naeslund and Laasasenaho2.

Any variable may be included in the model, including but not limited to species, DBH, form class, tree quality or value.

Models may be updated and altered depending on the species and region, and new models incorporated at any time into the model database.

Referring now to FIG. 24, according to one embodiment of the present method, the user selects a crown vector file for analysis, calculates the crown size for each tree, and selects an appropriate data model that most closely represents the species depicted in the crown vector file and geographic location of the original input image. Using the model, each tree's DBH is calculated based on crown size. Additional aggregate tree stand and individual tree data is thereafter calculated, such as height and volume based on DBH, total breast height diameter distribution of trees, tree height distribution, tree stem number, tree stem number per hectare, total tree stem volume, and histogram distribution of trees by species, such histogram which can be adjusted by putting upper and lower limits on tree stem size. The reported data is displayed on ordinary display means, as illustrated in FIG. 25. Examples of physical data calculations are:

Diameter breast height=(6.043*sqrt($A$))+1.283;

Tree Height=div(($A$*$A$),((2.09000+(0.14050*$A$))*
(2.09000+(0.14050*$A$))))+1.30000; and Stem Volume=000022927*pow($A$,1.91505)*pow
(0.99146,$A$)*pow($B$,2.82541)*pow(($B$−1.3),-
1.53547).

In the equation, $A$=tree crown area.

According to another embodiment of the present method, batch modeling of delineated and classified features is performed using pre-selected models.

As indicated in FIG. 24, the resulting data is stored in vector file format. Preferably, the aggregate stand data is stored on the stand attribute table that is associated with the stand vector file generated according to the stand segmentation aspect of the current. Additionally, the tree data may be stored on the attribute table in the crown vector file.

According to one embodiment of the present method, statistical information is also generated based on the modeling results, which includes, but is not limited to valuation of timber, estimation of property values based on public tax and terrain slope information, over or under-valuation of property by comparing market value to timber valuation, and estimation of vegetation growth rates and agricultural production. For example, the value of timber in a particular tree stand is calculated using the tree stem volume calculated from crown area, and public market value information based on species. Total volume of species used for this determination can be limited depending on the size of the tree as specified by the user. The market value may be obtained from public information or may be user input.

Another example of valuation information that can be generated from a digital image is orchard output. For example, where crown areas are captured from a digital image of a grove of orange trees, an estimate of the oranges produced by the individual trees can be calculated, e.g., by applying an empirically based statistical classification model where crown areas of area A1 produce O1 oranges, A2 produce O2 oranges, where $A(x)$ is a range of areas, and $O(x)$ is average orange production for areas $A(x)$.

Statistical data is stored in the corresponding crown and/or stand vector file as indicated in FIG. 15, and can be displayed by ordinary display means.

It is recognized that the scope of the present method includes application of the current method to other empirical models that are based on species data, such as fruit and juice production from fruit baring trees, carbon production, etc and that the present method is not limited to any specific embodiment presented herein.

Example 1

A 2 foot digital ortho-rectified, color-balanced image in TIFF format was taken of a 12 square mile forested area in Nicholas County, West Virginia. The image was taken in RGB true color, and was taken in the fall when leaves are in senescence. Stand segmentation was performed using seeded region growing. Tree crowns were captured using segmentation, and filtering parameters used to eliminate undesirable details were a prefilter value of 4, a seed threshold of 90, and a cut ratio of 90. Species were classified according to supervised classification based on the teaching method. Three trees were selected per species. Three species were selected and identified using nearest neighborhood classification: poplar, red maple and red oak.

For data analysis, a model was selected for each of the three species based on data from 200 field measurements of different sized trees in Pennsylvania. The resulting data was displayed and is illustrated in FIG. 25.

Example 2

A stand area of 24 acres was selected south of Dugway Rd, in Madison County, New York, Tax Map Number 148-1-7. Low level segmentation was performed to delineate tree crowns, and species classification and tree crown data analysis were performed to determine tree species and total tree stem volume in board-feet. A total of 93,402 board-feet was calculated based on only trees of DBH greater than 12 inches. Trees with DBH greater than 25 inches were not used in the data analysis.

Species classification resulted in 85% Hard Maple, 13% undefined, and 2% Cherry. The Norway Spruce Model was selected based on the species present in the image. The following table illustrates a breakdown of tree stem volume based on the total number of trees per DBH:

| DBH (in.) | Tree Count | Total Volume/DBH (Bf) |
|---|---|---|
| <12 | 0 | 0 |
| 12 | 154 | 2952 |
| 13 | 167 | 5504 |
| 14-15 | 293 | 18374 |
| 16-17 | 197 | 23001 |
| 18-19 | 107 | 19339 |
| 20-21 | 63 | 16496 |
| 22-23 | 18 | 5860 |
| 24-25 | 5 | 1876 |

Example 3

A stand area of 18 acres was selected in Madison County, NY, East of Cazenoia, Moraine Road, Tax Map Number 96-2-1. Low level segmentation was performed to delineate tree crowns, and species classification and tree crown data analysis were performed to determine tree species and total tree stem volume in board-feet. A total of 25,629 board-feet was calculated based on only trees of DBH greater than 14 inches.

Species classification resulted in 45% Hard Maple, 15% Cherry, 4% Red Maple, and 36% undefined. The Norway Spruce Model was selected based on the species present in the image. The following table illustrates a breakdown of tree stem volume based on the total number of trees per DBH:

| DBH (in.) | Tree Count | Total Volume/DBH (B!) |
|---|---|---|
| 14-15 | 64 | 9832 |
| 6-17 | 87 | 10027 |
| 18-19 | 22 | 4039 |
| 20-21 | 5 | 1374 |
| 22-23 | 1 | 357 |
| 24-25 | 0 | 0 |
| 26-27 | 0 | 0 |
| 28-29 | 0 | 0 |
| 30-31 | 0 | 0 |
| 32-33 | 0 | 0 |
| 34+ | 0 | 0 |

Timber value was then calculated using the total tree stem volume per species in Doyle and stump prices per 1000 Doyle. The following table illustrates the valuation data generated using the present method:

| Species | Volume (Doyle) | Stump Price (per 1000 Doyle) | Timber Value |
|---|---|---|---|
| Hard Maple | 11.533 | $ 629.00 | $ 7,254.26 |
| Cherry | 3,844 | $2,234.00 | $ 8,587.50 |
| Red Maple | 1,025 | $ 309.00 | $ 316.73 |
| Other | 9,226 | $ 131.00 | $ 1,208.61 |
| TOTAL | 25,628 | $ 3303.00 | $17,367.08 |

The foregoing illustrations of embodiments of the methods described herein are offered for the purposes of illustration and not limitation. It will be readily apparent to those skilled in the art that the embodiments described herein may be modified or revised in various ways without departing from the spirit and scope of this disclosure.

What has been described above comprises exemplary embodiments of a remote sensing and probabilistic sampling based forest inventory method. It is, of course, not possible to describe every conceivable combination of components or methodologies for purposes of describing this method, but one of ordinary skill in the art may recognize that many further combinations and permutations are possible in light of the overall teaching of this disclosure. Accordingly, the remote sensing and probabilistic sampling based forest inventory method described herein is intended to be illustrative only, and should be considered to embrace any and all alterations, modifications and/or variations that fall within the spirit and scope of the appended claims. Furthermore, to the extent that the term "includes" may be used in either the detailed description or elsewhere, this term is intended to be inclusive in a manner similar to the term "comprising" as that term is interpreted as a transitional word in a claim.

What is claimed is:

1. A computer-implemented forest inventory method comprising:
   a. processing imagery data using a computer system, said imagery data indicative of tree attribute information for said forest;
   b. using said computer system, classifying tree polygons within said imagery data to derive said tree attribute information;
   c. correlating field data using said computer system, said field data comprising at least one of actual tree attribute information and plot center location;
   d. using said computer system, generating a correlated model utilizing said tree attribute information derived from said imagery data and said actual tree attribute information; and
   e. generating a probabilistic forest inventory by applying said correlated model to all said imagery data using said computer system;
   f. wherein said classifying tree polygons comprises:
      i. superimposing at least one of CIR photography, stand shapes, tree crown polygon shapes and LiDAR data;
      ii. creating a classifier formula using discriminant analysis;
      iii. classifying polygons for all stands and strata;
      iv. manually reviewing species strata;
      v. calculating an average CIR band for individual tree crowns;
      vi. calculating a second order gray level texture feature;
      vii. selecting a subset of stands for classification; and
      viii. creating a training set for species at strata level.

2. A computer-implemented forest inventory method comprising:
   a. processing imagery data using a computer system, said imagery data indicative of tree attribute information for said forest;
   b. using said computer system, classifying tree polygons within said imagery data to derive said tree attribute information;
   c. correlating field data using said computer system, said field data comprising at least one of actual tree attribute information and plot center location;
   d. using said computer system, generating a correlated model utilizing said tree attribute information derived from said imagery data and said actual tree attribute information; and
   e. generating a probabilistic forest inventory by applying said correlated model to all said imagery data using said computer system;
   f. wherein correlating said field data further comprises:
      i. defining a sampling frame within said imagery data;
      ii. wherein said field data is collected from a field plot corresponding to said sampling frame;
      iii. determining a geo-referenced plot center such that said field plot corresponds to said sampling frame; and
      iv. correcting said plot center based upon field measurements; and
   g. using said computer system, correcting said plot center location to a location that results in the best match between tree locations indicated by said remote sensing data and tree locations verified by field plot measurements.

* * * * *